US012791758B2

(12) United States Patent
Rho et al.

(10) Patent No.: US 12,791,758 B2
(45) Date of Patent: Nov. 10, 2026

(54) META LENS, ELECTRONIC DEVICE INCLUDING THE SAME, AND METHOD OF MANUFACTURING THE META LENS

(71) Applicant: POSTECH Research and Business Development Foundation, Pohang-si (KR)

(72) Inventors: Junsuk Rho, Pohang-si (KR); Joohoon Kim, Pohang-si (KR); Junhwa Seong, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 310 days.

(21) Appl. No.: 18/404,124

(22) Filed: Jan. 4, 2024

(65) Prior Publication Data

US 2024/0319407 A1 Sep. 26, 2024

(30) Foreign Application Priority Data

Mar. 20, 2023 (KR) ........................ 10-2023-0036089
Jul. 25, 2023 (KR) ........................ 10-2023-0097032

(51) Int. Cl.
*G02B 1/00* (2006.01)

(52) U.S. Cl.
CPC .................................... *G02B 1/002* (2013.01)

(58) Field of Classification Search
CPC ...................................................... G02B 1/002
USPC .......................................................... 359/642
See application file for complete search history.

(56) References Cited

U.S. PATENT DOCUMENTS

| | | | | |
|---|---|---|---|---|
| 10,677,974 | B2 | 6/2020 | Lee et al. | |
| 11,231,544 | B2 | 1/2022 | Lin et al. | |
| 11,714,289 | B2 | 8/2023 | Lee et al. | |
| 2019/0154877 | A1* | 5/2019 | Capasso | G02B 5/18 |
| 2020/0400990 | A1 | 12/2020 | Godet et al. | |
| 2020/0409151 | A1 | 12/2020 | Calafiore | |

FOREIGN PATENT DOCUMENTS

| | | | |
|---|---|---|---|
| KR | 10-2008-0073824 | A | 8/2008 |
| KR | 10-1576043 | B1 | 12/2015 |
| KR | 10-2018-0044744 | A | 5/2018 |
| KR | 10-2020-0101044 | A | 8/2020 |
| KR | 10-2252351 | B1 | 5/2021 |
| KR | 10-2022-0019824 | A | 2/2022 |

(Continued)

OTHER PUBLICATIONS

Joohoon Kim et al: "Scalably manufactured high-index atomic layer-polymer hybrid metasurfaces for high-efficiency virtual reality metaoptics in the visible" arxiv.org, 201 Olin Library Cornell University Ithica, NY 14853, Aug. 26, 2022 (Aug. 26, 2022) (Year: 2022).*

(Continued)

*Primary Examiner* — Bumsuk Won
*Assistant Examiner* — Mitchell T Oestreich
(74) *Attorney, Agent, or Firm* — Sughrue Mion, PLLC

(57) ABSTRACT

A meta lens includes a substrate, a plurality of nanostructures provided on the substrate, and a high refractive index atomic layer formed along surfaces of the plurality of nanostructures and including a material having a refractive index greater than a refractive index of the plurality of nanostructures.

14 Claims, 39 Drawing Sheets

(56) References Cited

FOREIGN PATENT DOCUMENTS

| | | | |
|---|---|---|---|
| KR | 10-2022-0093263 | A | 7/2022 |
| WO | 2022270703 | A1 | 12/2022 |

OTHER PUBLICATIONS

Communication dated Apr. 17, 2025 in Korean Application No. 10-2023-0097032.
Mohammadreza Khorasaninejad et al., "Metalenses at visible wavelengths: Diffraction-limited focusing and subwavelength resolution imaging," Science, Applied Optics, Jun. 3, 2016, pp. 1190-1194, vol. 352, issue 6290.
Wei Ting Chen et al., "A broadband achromatic metalens for focusing and imaging in the visible," Nature Nanotechnology, Mar. 2018, pp. 220-227, vol. 13, Macmillan Publishers Limited, part of Springer Nature.
Shuming Wang et al., "A broadband achromatic metalens in the visible," Nature Nanotechnology, Mar. 2018, pp. 227-232, vol. 13, Macmillan Publishers Limited, part of Springer Nature.
Alan She et al., "Large area metalenses: design, characterization, and mass manufacturing," Optics Express, Jan. 22, 2018, 13 pages, vol. 26, No. 2, Optical Society of America under the terms of the OSA Open Access Publishing Agreement.
Joon-Suh Park et al., "All-Glass, Large Metalens at Visible Wavelength Using Deep-Ultraviolet Projection Lithography," Nano Letters, Nov. 14, 2019, pp. 8673-8682, vol. 19, American Chemical Society.
Dr. Jin Tao et al., "Mass-manufactured beam-steering metasurfaces for high-speed full-duplex optical wireless broadcasting communications," Wiley VCH, 37 pages, Institute of Microelectronics, Chinese Academy of Sciences, Beijing.
Aleksandrs Leitis et al., "Wafer-Scale Functional Metasurfaces for Mid-Infrared Photonics and Biosensing," Advanced Materials, Sep. 7, 2021, 10 pages, vol. 33.
Joohoon Kim et al., "Scalable manufacturing of high-index atomic layer-polymer hybrid metasurfaces for metaphotonics in the visible," Nature Materials, Mar. 23, 2023, pp. 474-482, vol. 22.
Extended European Search Report issued May 17, 2024 in European Application No. 23220119.4.
Joohoon Kim, et al., "Scalably manufactured high-index atomic layer-polymer hybrid metasurfaces for high-efficiency virtual reality metaoptics in the visible", arxiv.org, Cornell University Library, Aug. 26, 2022, XP091303353 (28 pages total).
Communication dated Jun. 26, 2026, in European Application No. 23 220 119.4.
Badloe, et al., "Computation at the speed of light: metamaterials for all-optical calculations and neural networks", Advanced Photonics, 2022, vol. 4, No. 6, pp. 064002-1-064002-21 (21 pages).

* cited by examiner

META LENS, ELECTRONIC DEVICE INCLUDING THE SAME, AND METHOD OF MANUFACTURING THE META LENS

CROSS-REFERENCE TO RELATED APPLICATION

This application is based on and claims priority under 35 U.S.C. § 119 to Korean Patent Application Nos. 10-2023-0036089, filed on Mar. 20, 2023, and 10-2023-0097032, filed on Jul. 25, 2023, in the Korean Intellectual Property Office, the disclosures of which are incorporated by reference herein in their entireties.

BACKGROUND

1. Field

The disclosure relates to a meta lens and a method of manufacturing the meta lens.

This invention was supported by Samsung Research Funding & Incubation Center of Samsung Electronics under Project Number SRFC-IT1901-52.

2. Description of the Related Art

Meta lenses include flat diffractive elements having meta-structures. Meta lenses are attracting increasing interest in many fields because they exhibit various optical effects, which have not been achieved by existing refractive elements, and may be used to manufacture thin optical systems.

A meta-structure includes a nanostructure with a shape, a period, or the like less than the wavelength of incident light. A phase profile suitable for desired optical performances may be obtained by controlling the arrangements and shapes of nanostructures, and these design details are properly implemented through specific processes.

Recently, research has been conducted on manufacturing methods capable of mass-producing meta lenses. For example, mass production processes, through which desired nanostructure shapes are appropriately achieved using i-line stepper lithography, KrF stepper lithography, or the like have been attempted. However, due to the low patterning resolution and limitations in usable materials, it is not easy to produce meta lenses that may be used in the entire visible light range.

SUMMARY

Provided are a meta lens and a method of the manufacturing the meta lens.

Additional aspects will be set forth in part in the description which follows and, in part, will be apparent from the description, or may be learned by practice of the presented embodiments of the disclosure.

According to an aspect of the disclosure, a meta lens includes a substrate, a plurality of nanostructures provided on the substrate, and a high refractive index atomic layer formed along surfaces of the plurality of nanostructures and including a material having a refractive index greater than a refractive index of the plurality of nanostructures.

The high refractive index atomic layer may include $TiO_2$.

A thickness of the high refractive index atomic layer may be about 20 nm to about 30 nm.

A thickness of the high refractive index atomic layer may be determined such that a polarization conversion efficiency of green light by the nanostructures coated with the high refractive index atomic layer is 70% or more.

The high refractive index atomic layer may include $ZrO_2$.

The plurality of nanostructures may include UV curable resin.

A flat layer may be further provided between the substrate and the plurality of nanostructures and includes the same material as the plurality of nanostructures.

According to another aspect of the disclosure, an electronic device includes a lens assembly including any one of the meta lenses described above, an image sensor configured to convert, formed by the lens assembly, an optical image of an object into an electrical signal, and a processor configured to process a signal from the image sensor.

According to another aspect of the disclosure, an electronic device includes a display device providing image light, any one of the meta lenses described above, the meta lens focusing light provided from the display device onto a field of view of a user, and a processor configured to control the display device.

The electronic device may further include a beam splitter located on a path along which the image light is directed to the field of view of the user, wherein the processor is further configured to control the display device to output an additional image based on an environment the user is looking at.

According to another aspect of the disclosure, a method of manufacturing a meta lens includes manufacturing a master stamp including a first pattern identical to an array of a plurality of nanostructures to be provided in the meta lens, manufacturing a replica mold by replicating the master stamp, forming a nanostructure layer including the plurality of nanostructures by imprinting the replica mold on a UV curable resin, and conformally forming a high refractive index atomic layer on surfaces of the plurality of nanostructures.

The method may further include preparing a reticle for manufacturing the master stamp.

The manufacturing of the master stamp may include forming a hard mask layer on a substrate, forming a photoresist layer on the hard mask layer, patterning the photoresist layer so that the photoresist layer has the first pattern, etching the hard mask layer using the photoresist layer patterned to have the first pattern as an etching mask, and etching the substrate using the patterned photoresist layer and the etched hard mask layer as an etching mask.

During the patterning of the photoresist layer, a step and scan exposure process may be performed using only some light that is incident near an optical axis of a lens optical system.

The substrate may include a silicon substrate having a diameter of 4 inches or more.

The hard mask layer may include an amorphous carbon layer.

The high refractive index atomic layer may include $TiO_2$.

A thickness of the high refractive index atomic layer may be about 20 nm to about 30 nm.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
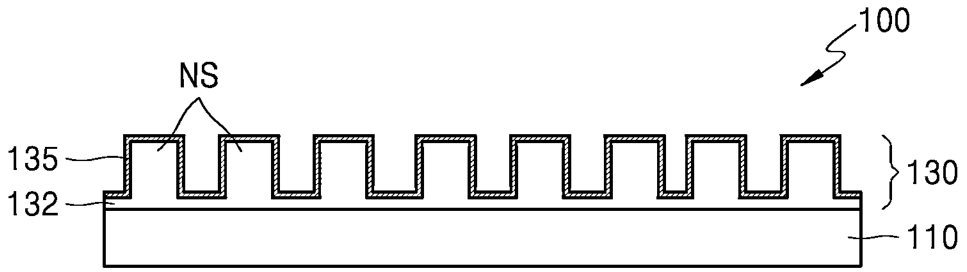
FIG. 1 is a cross-sectional view showing a schematic structure of a meta lens according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described in detail with reference to the accompanying drawings. Embodiments described below are only examples, and it is possible to make various changes from the embodiments. In the following drawings, the same reference numerals refer to the same components, and the size of each of components in the drawings may be exaggerated for clarity and convenience of description.

Hereinafter, when an element is referred to as being "above" or "on" another element, not only may the element be directly above and in contact with another element, but also the element may be above but not in contact with another element.

Although terms, such as first and second, may be used to describe various elements, these terms are only used to distinguish one component from other components. These terms are not intended to limit that substances or structures of elements are different.

The singular forms include the plural forms as well, unless the context clearly indicates otherwise. In addition, when it is described that a part "includes" a certain component, this means that the part may further include other components, rather than excluding other components, unless specifically stated to the contrary.

In addition, terms used herein, such as " . . . part" and " . . . module" refer to a unit that processes at least one function or operation, which may be provided as hardware or software or as a combination of hardware and software.

The use of the term "the" and other demonstratives similar thereto may correspond to both a singular form and a plural form.

Operations in a method may be performed in any appropriate order, unless explicitly stated that the operations have to be performed in the mentioned order. Also, the use of all exemplary terms (e.g., "etc." or "and (or) the like") is only intended to describe a technical concept in detail. Unless limited by the claims, the scope of the disclosure is not necessarily limited by theses exemplary terms.

FIG. 1 is a cross-sectional view showing a schematic structure of a meta lens 100 according to an embodiment.

The meta lens 100 may include a diffractive element that utilizes nanostructures NS having sub-wavelength shape dimensions. The sub-wavelength refers to a value less than the wavelength of incident light that is to be modulated. Also, the sub-wavelength refers to a value less than a central wavelength in the wavelength band of the incident light. A shape and arrangement of the nanostructures NS provided in a meta optical device (or a meta lens) may be set to obtain desired lens performance for incident light, for example, the desired focal length, F number, or the like. The sub-wavelength nanostructures may be referred to as meta-atoms, and arrays of nanostructures may be referred to as meta-surfaces.

The meta lens 100 may include a substrate 110, a plurality of nanostructures NS provided on the substrate 110, and a high refractive index atomic layer 135 formed along the surfaces of the plurality of nanostructures NS.

A flat layer 132 may be located between the nanostructures NS and the substrate 110. The flat layer 132 includes the same material as the nanostructures NS and may be formed through a manufacturing process that is described below. The flat layer 132 may be very thin or substantially non-existent. The plurality of nanostructures NS and the flat layer 132 may be collectively referred to as a nanostructure layer 130.

The substrate 110 may include any one of glass (fused silica, BK7, etc.), quartz, polymer (PMMA, SU-8, etc.), and a plastic material, and may include a semiconductor substrate. The substrate 110 may include a material having a refractive index lower than that of the nanostructures NS. However, the embodiment is not limited thereto.

The nanostructures NS may include a material having a different refractive index from a surrounding material, for example, a material having a high refractive index. For example, the nanostructures NS may include crystalline silicon (c-Si), polycrystalline silicon (p-Si), amorphous silicon (a-Si), group III-V compound semiconductors (GaP, GaN, GaAs, etc.), SiC, $TiO_2$, SiN and/or a combination thereof.

The nanostructures NS may include ultraviolet (UV) curable resin. The UV curable resin that constitutes the nanostructures NS may be selected considering properties, such as the refractive index, surface energy, and shrinkage. For example, a UV curable resin having low surface energy, small shrinkage, and a high refractive index in the visible wavelength band may be used.

The shrinkage of the UV curable resin may be, for example, less than 5%. The UV curable resin may exhibit a refractive index of about 1.5 to about 1.6 in the visible wavelength band.

If the surface energy of the UV curable resin is low, when manufacturing the meta lens 100 using an imprint method, it is easy to separate a replica mold from the nanostructures NS after the imprinting, and the manufacturing yield may also be improved.

For example, if the surface energy of the UV curable resin is high, a separate surface treatment process may be required for the replica mold so that the replica mold is properly separated from the nanostructures NS.

An existing meta lens process through nanoimprinting has been performed to improve the performance of a meta lens by mixing particles having a high refractive index in a visible light region into a resin, but the meta lens produced in this manner has efficiency of only about 50%. In the embodiment, the freedom of resin to be used may be increased by eliminating the process of mixing these particles into the resin. Also, it is possible to use a resin material having characteristics of low surface energy and low shrinkage (<5%) that allows post-processing to be performed without additional surface treatment. For example, commercial MINS-311RM resin may be used as an UV curable resin.

The high refractive index atomic layer 135 includes a material having a refractive index higher than that of the nanostructures NS. For example, when the material of the nanostructures NS includes the UV curable resin, the high refractive index atomic layer 135 may include a material having a higher refractive index than the UV curable resin. The high refractive index atomic layer 135 may include, for example, $TiO_2$. $TiO_2$ may exhibit a refractive index of about 2.5 in the visible wavelength band. The material of the high refractive index atomic layer 135 is not limited to $TiO_2$, and various materials showing a higher refractive index than the UV curable resin in the visible wavelength band may be used. Also, the material of the high refractive index atomic layer 135 may include a material suitable for a wavelength band other than the visible wavelength band, depending on the purpose of the meta lens 100. For example, $ZrO_2$ suitable for the ultraviolet wavelength band may be used.

The high refractive index atomic layer 135 is proposed considering that it may be difficult to achieve the desired lens performance in the visible wavelength band with the refractive index shown by the material of the nanostructures NS. The material of nanostructures NS may be determined according to manufacturing convenience. However, the material of the nanostructures NS may be limited depending on the manufacturing method described below using an imprinting method, and it may be difficult to achieve the desired refractive index. Therefore, the embodiment adopts a structure in which the surfaces of the nanostructures NS are conformally coated with a material having a higher refractive index than the nanostructures NS.

The thickness of the high refractive index atomic layer 135 may be determined by considering the light modulation efficiency of the meta lens 100, that is, by considering the light modulation efficiency of the nanostructures NS coated with the high refractive index atomic layer 135. The light modulation efficiency may be expressed as polarization conversion efficiency. For example, the arrangement angles of the plurality of nanostructures NS included in the meta lens 100 are determined differently depending on the locations. Therefore, a desired phase profile may be obtained through a method in which the polarization conversion of incident light by the nanostructures NS is controlled depending on the locations. In this case, as the polarization conversion efficiency increases, the desired phase profile may be better obtained. However, the arrangement patterns of the nanostructures NS are not limited thereto. For example, a desired phase profile may be obtained by arranging nanostructures NS of different sizes depending on the locations.

The thickness of the high refractive index atomic layer 135 may be about 20 nm to about 30 nm and may be about 20 nm to about 25 nm. However, the embodiment is not limited thereto, and the thickness of the high refractive index atomic layer 135 may be determined, considering the polarization conversion efficiency, depending on the detailed shape and dimensions of the nanostructures NS. For example, the thickness of the high refractive index atomic layer 135 is set such that the polarization conversion efficiency of light in the entire visible wavelength band by the nanostructures NS coated with the high refractive index atomic layer 135 is 60% or more or 65% or more. Also, the thickness of the high refractive index atomic layer 135 may be set such that the polarization conversion efficiency of, for example, green light is 60% or more, 65% or more, 70% or more, 80% or more, or 85% or more.

Figure 2:
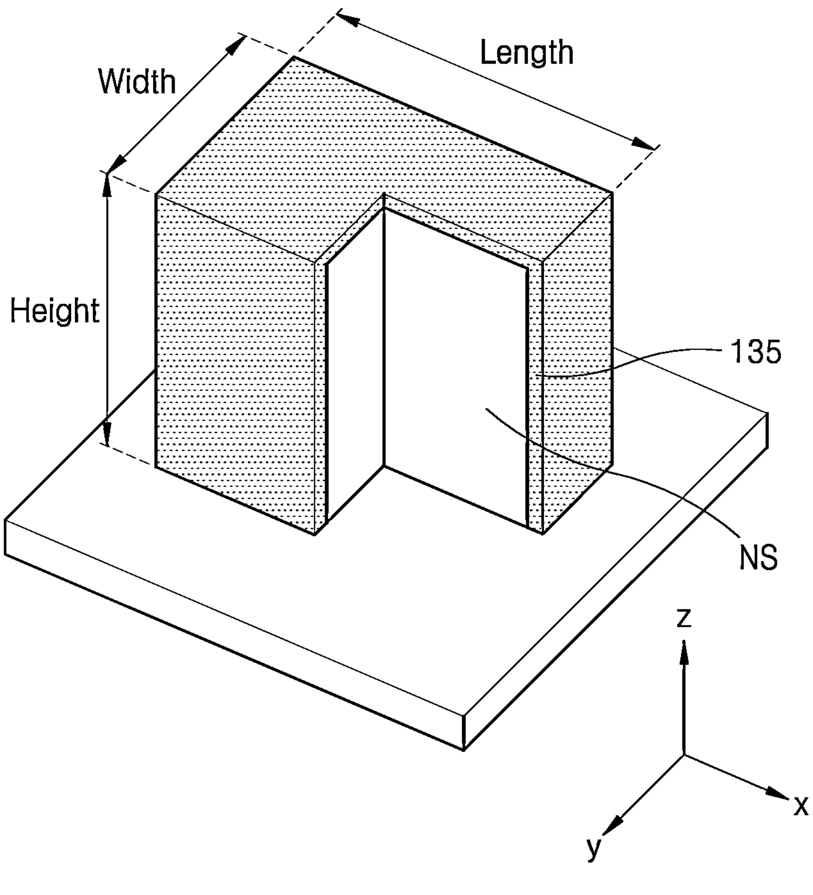
FIG. 2 is a partially cut perspective view showing an example of a shape of a nanostructure in the meta lens according to an embodiment.

FIG. 2 is a partially cut perspective view showing an example of the shape of a nanostructure NS provided in the meta lens according to an embodiment.

The nanostructure NS may have a rectangular parallelepiped shape with defined height, width, and length. The high refractive index atomic layer 135 having a certain thickness may be formed along the surfaces of the nanostructures NS.

The simulation results to determine the details of these shape dimensions are examined with reference to FIGS. 3 to 7.

Figure 3:
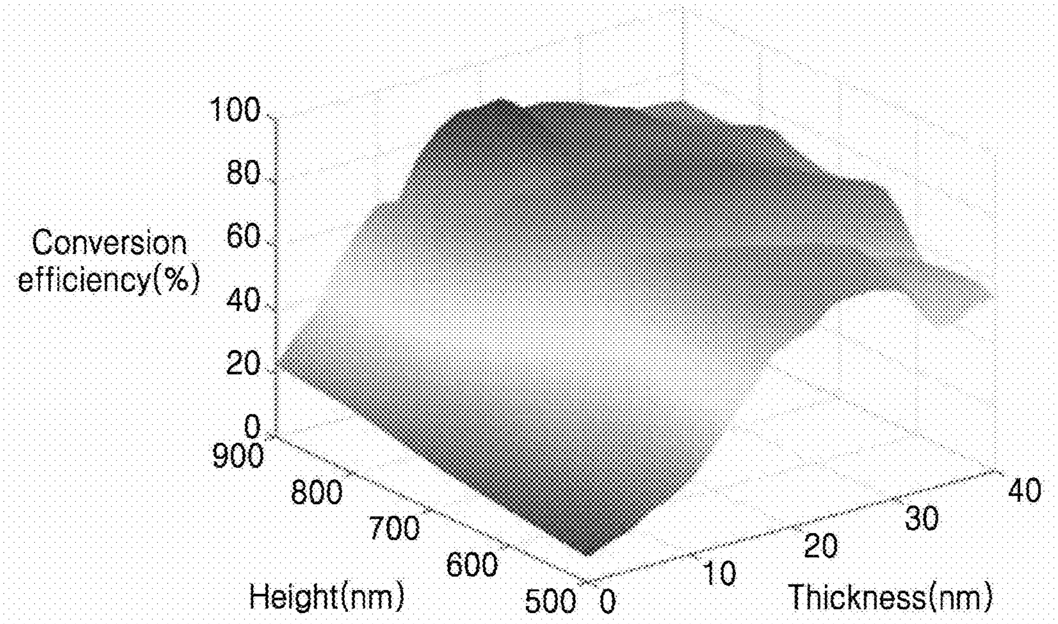
FIG. 3 is a simulation diagram showing a conversion efficiency depending on heights of nanostructures provided in the meta lens according to an embodiment and thicknesses of a high refractive index atomic layer applied on the nanostructures.
Figure 4:
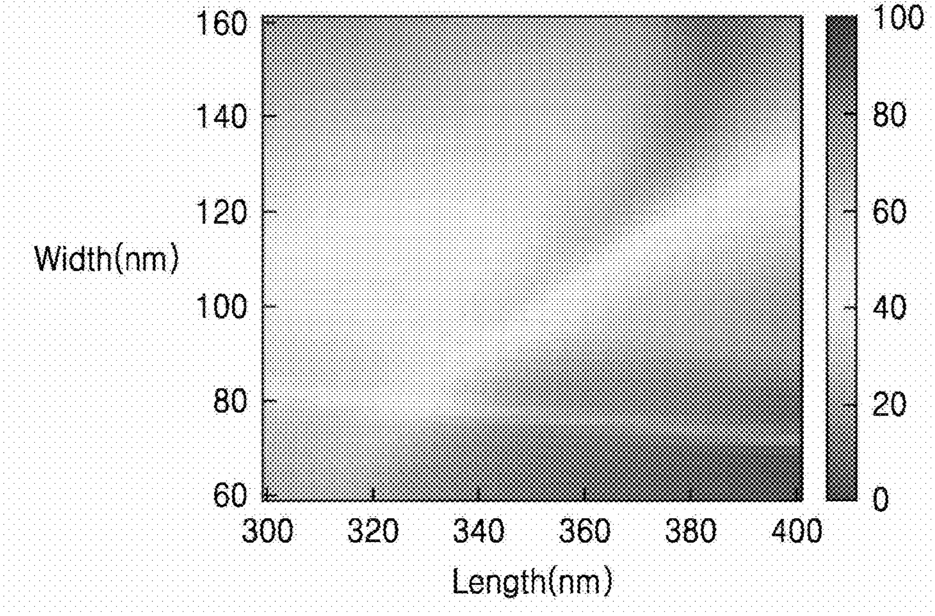
FIG. 4 is a simulation diagram showing a conversion efficiency depending on widths and lengths of the cross-sections of the nanostructures provided in the meta lens according to an embodiment.

FIG. 3 is a view showing conversion efficiency depending on heights of nanostructures provided in the meta lens according to an embodiment and thicknesses of a high refractive index atomic layer applied on the nanostructures, and FIG. 4 is a view showing conversion efficiency depending on widths and lengths of the cross-sections of the nanostructures provided in the meta lens according to an embodiment.

In the simulation, the wavelength of the incident light is 532 nm, the length, width, and height of the nanostructure NS are about 260 nm to about 400 nm, about 70 nm to about 200 nm, and about 500 nm to about 900 nm, respectively, and the arrangement pitch of the nanostructure NS is 450 nm. Also, the thickness of the high refractive index atomic layer 135 is about 0 nm to about 40 nm. In this case, the material of the nanostructure NS includes a UV curable resin, the material of the high refractive index atomic layer 135 includes $TiO_2$, and the material of the substrate 110 is $SiO_2$.

The simulation diagram of FIG. 4 shows a case in which the height of the nanostructure NS is 900 nm and the thickness of the high refractive index atomic layer 135 is 23 nm.

Through this simulation, the width, length, and height of the nanostructure NS and the thickness of the high refractive index atomic layer 135 may be set appropriately.

Figure 5:
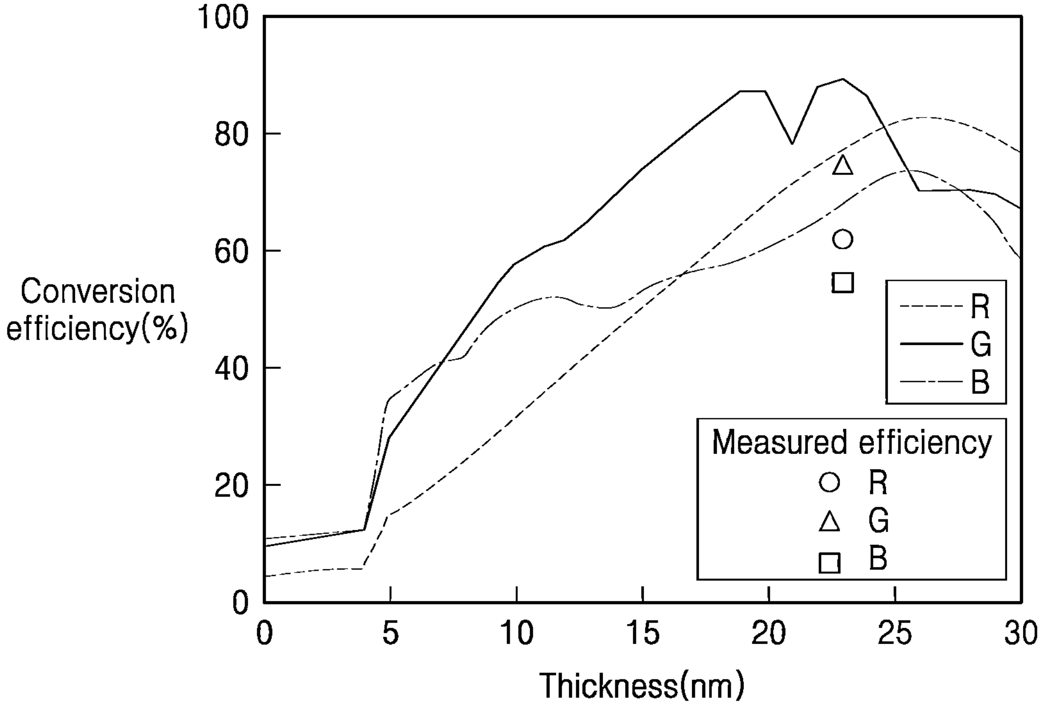
FIG. 5 is a simulation diagram showing a conversion efficiency for light of R, G, and B wavelengths, depending on thicknesses of the high refractive index atomic layer applied on the nanostructures provided in the meta lens according to an embodiment.

FIG. 5 is a simulation diagram showing conversion efficiency for light of R, G, and B wavelengths, depending on thicknesses of the high refractive index atomic layer 135 applied on the nanostructures NS provided in the meta lens according to an embodiment.

In the entire visible wavelength band, the thickness of the high refractive index atomic layer 135, which exhibits high polarization conversion efficiency, for example, efficiency of 60% or more, may be in a range from about 20 nm to about 25 nm.

FIG. 5 shows results measured when the high refractive index atomic layer 135 is manufactured to a thickness of 23 nm, and it can be seen that these results are similar to the simulation results.

Figure 6:
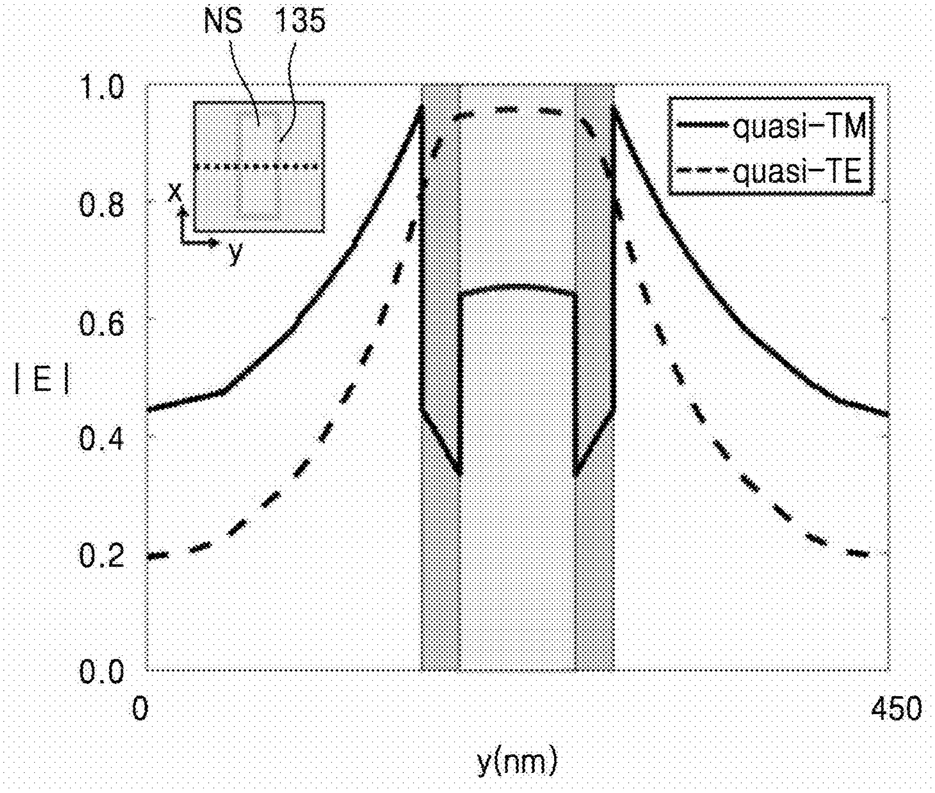
FIG. 6 is a simulation diagram showing an electric field distribution due to nanostructures provided in the meta lens according to an embodiment.

FIG. 6 is a simulation diagram showing an electric field distribution due to nanostructures NS provided in the meta lens according to an embodiment.

The simulation results show two main modes which are excited by circularly polarized incident light on the cross-section perpendicular to the height direction of the nanostructures NS. Each of a quasi transverse electric (quasi-TE) mode and a quasi transverse magnetic (quasi-TM) mode are excited by x-direction polarization components and y-direction polarization components. The birefringence of the nanostructures NS may be expressed as the difference (Δn) in refractive indexes between the above two modes. As Δn is increased, high polarization conversion efficiency may be obtained.

Figure 7:
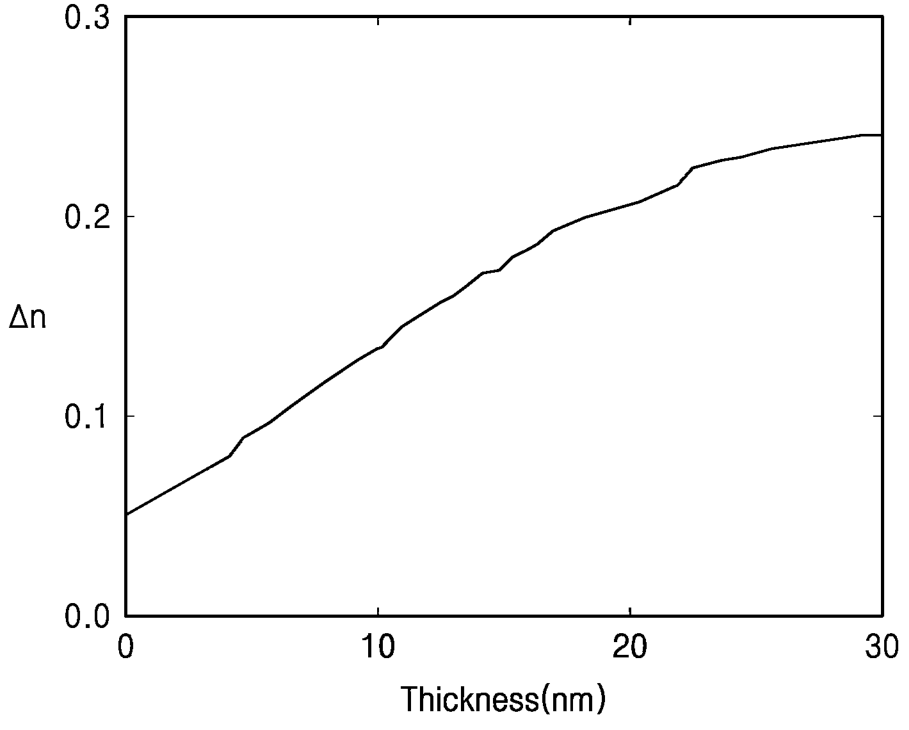
FIG. 7 is a simulation diagram showing a change in refractive index depending on thicknesses of the high refractive index atomic layer applied to the nanostructures provided in the meta lens according to an embodiment.

FIG. 7 is a simulation diagram showing a change in refractive index depending on thicknesses of the high refractive index atomic layer 135 applied on the nanostructures provided in the meta lens according to an embodiment.

Referring to FIG. 7, Δn increases according to the thickness of the high refractive index atomic layer 135 and then becomes saturated. Similar to the results seen in the graph of FIG. 5, it can be seen that the thickness of the high refractive index atomic layer 135 is set to about 20 nm to about 25 nm.

Figure 8:
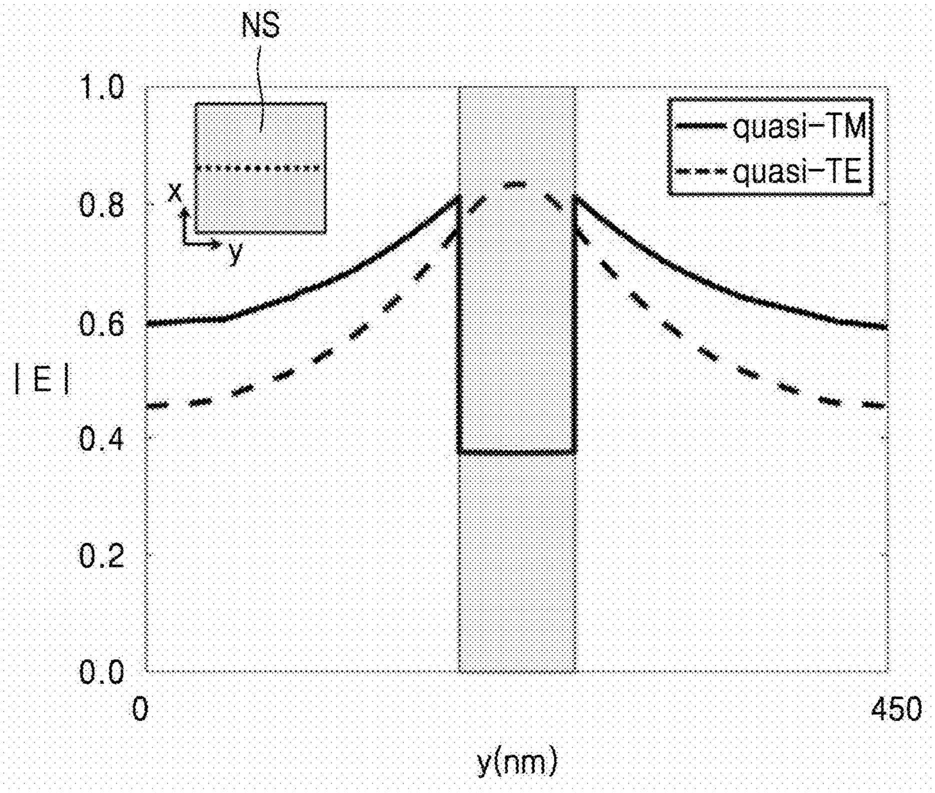
FIG. 8 is a simulation diagram showing an electric field distribution due to nanostructures provided in a meta lens according to a comparative example.

FIG. 8 is a simulation diagram showing an electric field distribution due to nanostructures provided in a meta lens according to a comparative example.

The meta lens of the comparative example has a structure in which nanostructures NS include UV curable resin, but the meta lens of the comparative example does not include the high refractive index atomic layer of the embodiment.

Referring to FIG. 8, a quasi-TE mode and a quasi-TM mode are excited by circularly polarized light, that is, by x-direction polarization components and y-direction polarization components. When comparing FIG. 8 with FIG. 6 that is the result of the embodiment, it may be analyzed that the comparative example shows a lower Δn than the embodiment and thus exhibits low polarization conversion efficiency.

In addition, the meta lens 100 according to the embodiment, which has a structure in which the high refractive index atomic layer 135 is conformally formed on the surfaces of the nanostructures NS, may exhibit strong performance against external shocks, compared to the meta lens according to the comparative example, that is, the meta lens without a high refractive index atomic layer. As a result of simulating bending stiffness, the bending stiffness of the structure according to the embodiment, in which the high refractive index atomic layer 135 is applied on the surfaces of the nanostructures NS, is 35.621 N/m, and this value is calculated to be about 770 times higher than the nanostructures according to the comparative example in which the bending stiffness is calculated to be 0.046 N/m.

Figure 9:
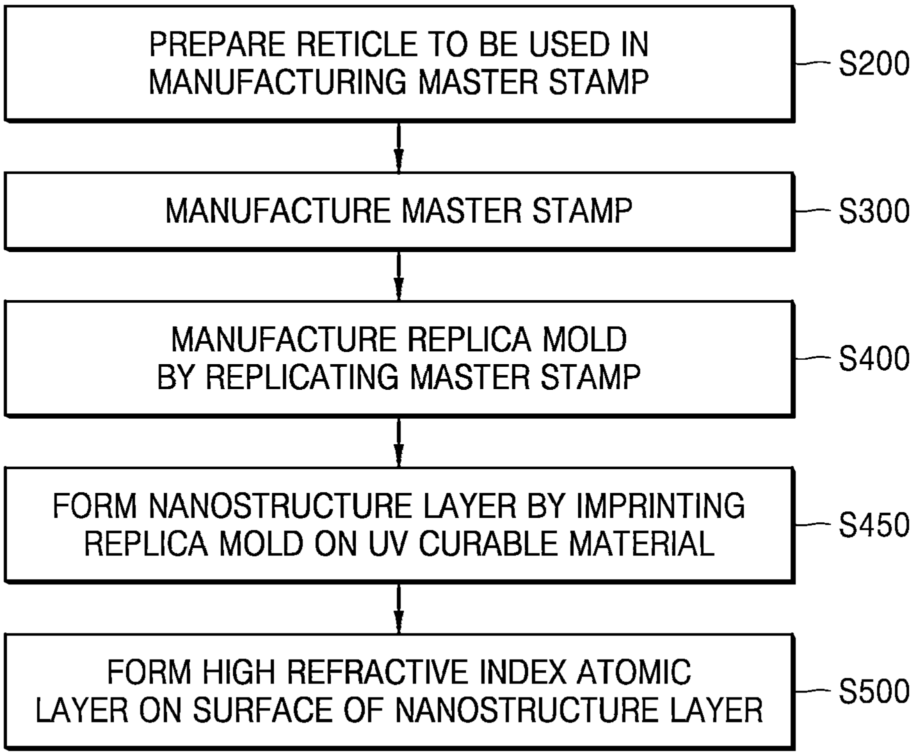
FIG. 9 is a flowchart schematically explaining a method of manufacturing a meta lens according to an embodiment.

FIG. 9 is a flowchart schematically explaining a method of manufacturing a meta lens according to an embodiment.

A meta lens manufacturing method according to an embodiment may include manufacturing a master stamp (S300), forming a replica mold by replicating the master stamp (S400), forming a nanostructure layer by imprinting the replica mold on UV curable resin (S450), forming a high refractive index atomic layer on the surface of the nanostructure layer (S500). Also, before manufacturing the master stamp, an operation (S200) of preparing a reticle to be used in an exposure process when manufacturing the master stamp may be further performed.

FIGS. 10A to 10E are views showing an example of a process of manufacturing a reticle 200 used in manufacturing the master stamp.

Figure 10A:
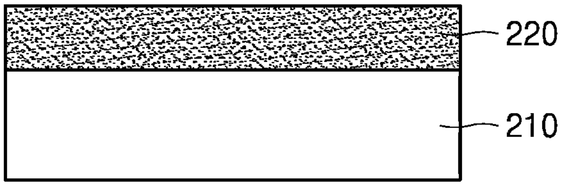
FIGS. 10A to 10E are views showing an example of a process of manufacturing a reticle used in manufacturing a master stamp.

Referring to FIG. 10A, a photoresist layer 220 is formed on a transparent substrate 210.

Figure 10B:
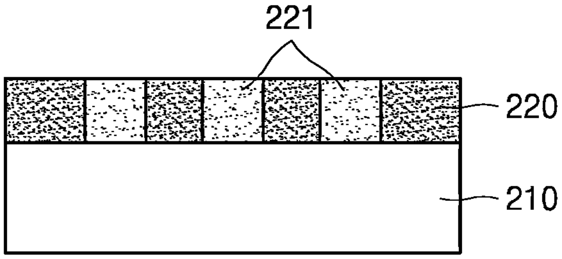

Referring to FIG. 10B, an exposure region 221 is formed, in a predetermined pattern, on the photoresist layer 220. This process may be performed using an electron beam lithography method.

Figure 10C:
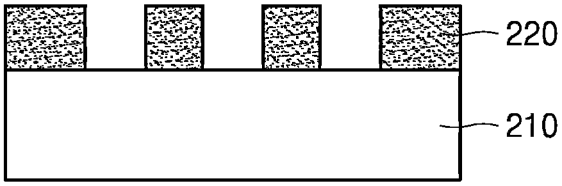

Next, when the exposure region 221 is removed through a development process, the photoresist layer 220 is patterned as shown in FIG. 10C. The pattern formed on the photoresist layer 220 corresponds to the reverse pattern of the master stamp to be manufactured.

Figure 10D:
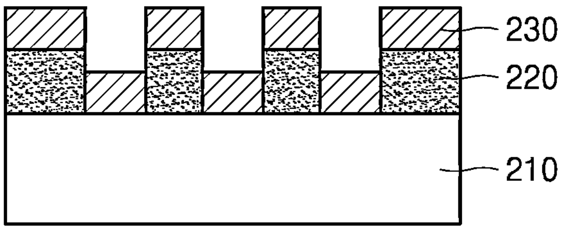

Referring to FIG. 10D, a metal layer 230 is formed on the patterned photoresist layer 220. The metal layer 230 may include various metals capable of blocking light. The metal layer 230 may include, for example, aluminium (Al), but the embodiment is not limited thereto.

A lift-off process is performed on the structure of FIG. 10D to remove the patterned photoresist layer 220. Here, portions of the metal layer 230, which are formed on the photoresist layer 220, are removed together with the photoresist layer 220.

Figure 10E:
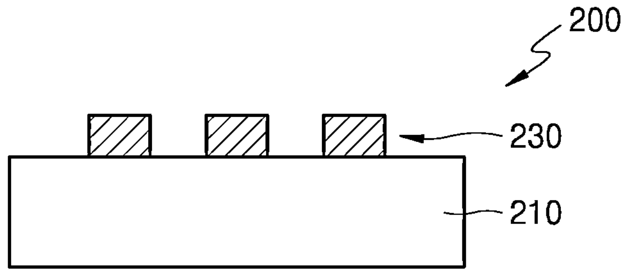

Referring to FIG. 10E, the reticle 200, in which the patterned metal layer 230 is formed on the transparent substrate 210, is provided.

FIGS. 11A to 11G are views showing an example of a process of manufacturing the master stamp 300.

The master stamp 300 may be manufactured through an exposure process using the reticle 200 that has been prepared through the process of FIGS. 10A to 10E.

Figure 11A:
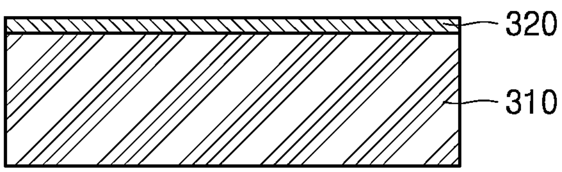
FIGS. 11A to 11G are views showing an example of a process of manufacturing the master stamp.

First, referring to FIG. 11A, a hard mask layer 320 may be formed on a substrate 310. The substrate 310 may include, for example, a silicon substrate. The substrate 310 may have various sizes. The substrate 310 may have a diameter of 4 inches or more, for example, 4 inches, 6 inches, 8 inches, or 12 inches, but the embodiment is not limited to these sizes. The hard mask layer 320 may include, for example, an amorphous carbon layer. The hard mask layer 320 includes a material having a lower etch selectivity than a photoresist material that is to be formed on the hard mask layer 320, but the embodiment is not limited to amorphous carbon materials.

Figure 11B:
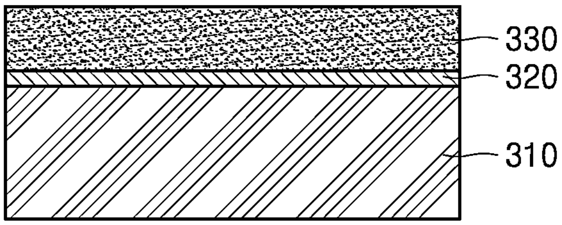

Referring to FIG. 11B, a photoresist layer 330 is formed on the hard mask layer 320.

The hard mask layer 320 and the photoresist layer 330 are used as an etch mask to etch the substrate 310 in a certain pattern. In a case where only the photoresist layer 330 is used as the etch mask, it is difficult to form a deep pattern on the substrate 310 because the photoresist layer 330 has a very high etch selectivity. In other words, the photoresist layer 330 may be completely etched before the substrate 310 is etched to a desired depth, and thus, it is difficult to manufacture a master stamp capable of manufacturing a high aspect ratio structure. The hard mask layer 320 having a low etch selectivity is further formed between the substrate 310 and the photoresist layer 330, so that a master stamp suitable for manufacturing a structure having a high aspect ratio may be manufactured.

Figure 11C:
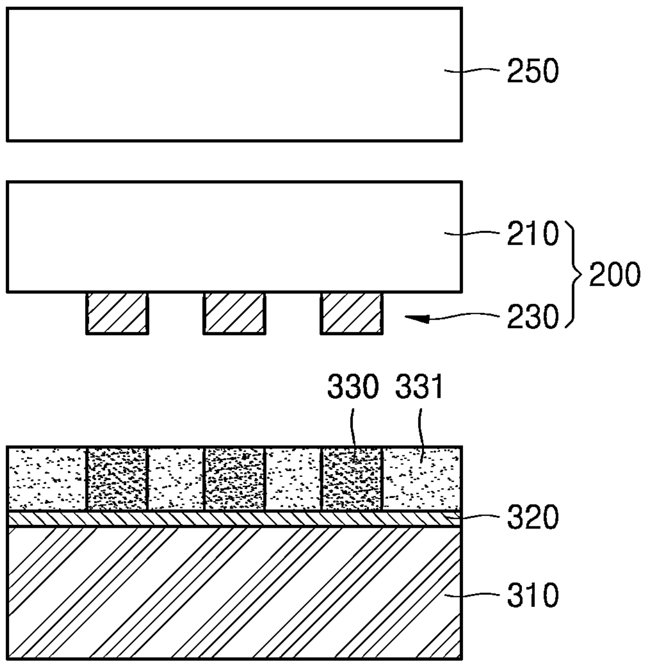
Figure 11D:
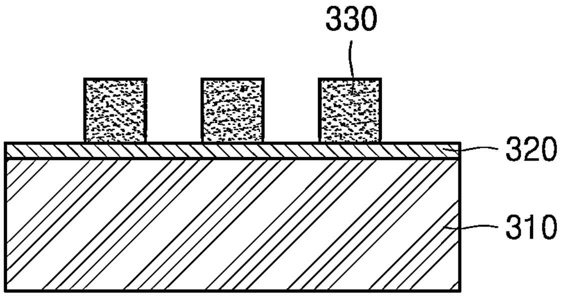

Referring to FIG. 11C, the photoresist layer 330 is patterned through an exposure process. The reticle 200, which has been prepared through the process of FIGS. 10A to 10E, serves as an exposure mask for light provided by an exposure device 250. The light provided from the exposure device 250 passes through only portions of the reticle 200, in which the metal layer 230 is not formed, thereby forming exposure regions 331. When the exposure regions 331 are removed through a development process, a patterned photoresist layer 330 is formed as shown in FIG. 11D. This exposure process may be performed using, for example, an ArF immersion scanner.

Figure 11E:
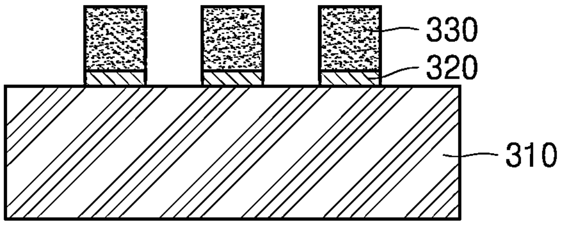

Referring to FIG. 11E, the hard mask layer 320 may be etched using the patterned photoresist layer 330 as an etch mask.

Figure 11F:
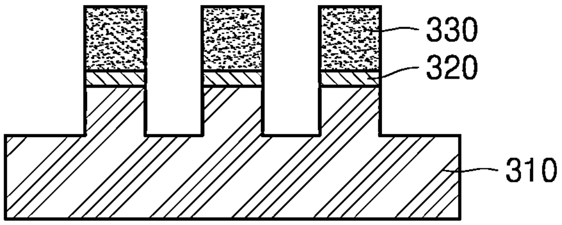
Figure 11G:
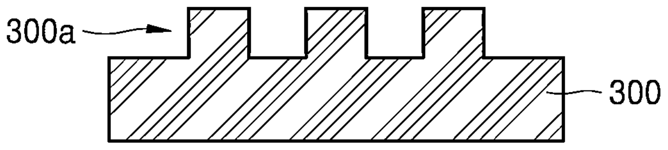

Referring to FIG. 11F, the substrate 310 is etched using the photoresist layer 330 and the hard mask layer 320 as an etch mask. As described above, when the substrate 310 is etched using only the photoresist layer 330 as an etch mask, the photoresist layer 330 having a high etch selectivity may be etched and removed before the substrate 310 is etched to a desired depth. When the hard mask layer 320 is further provided between the substrate 310 and the photoresist layer 330 as in the embodiment, the hard mask layer 320 having a low etch selectivity may serve as an etch mask, even if the photoresist layer 330 is completely etched and does not remain. Accordingly, it becomes possible to etch the substrate 310 to a desired depth. Next, when the photoresist layer 330 and the hard mask layer 320 are removed, the master stamp 300 having a pattern 300*a* is completed as shown in FIG. 11G.

Figure 12A:
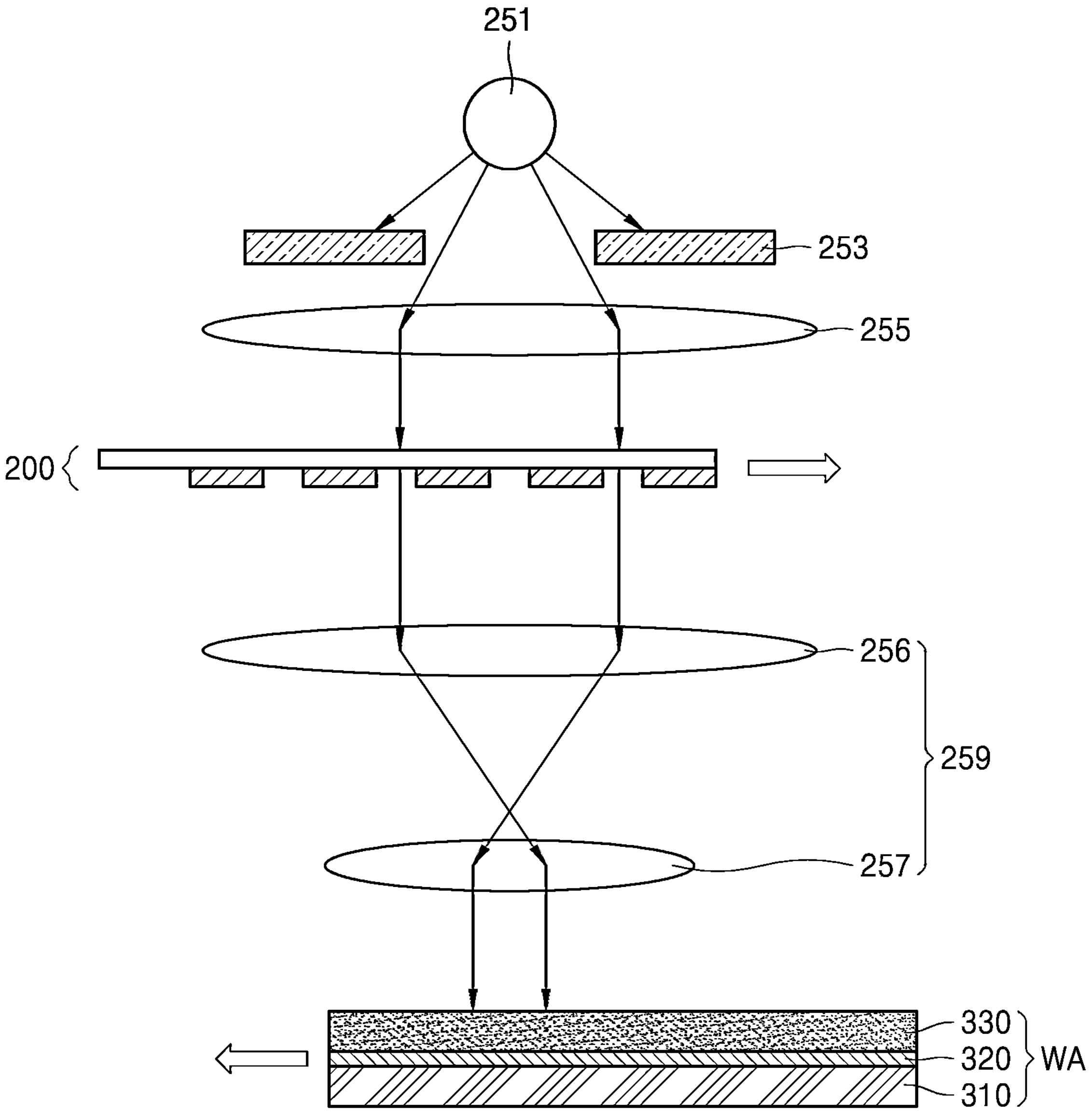
FIGS. 12A and 12B are views explaining details of an exposure process.
Figure 12B:
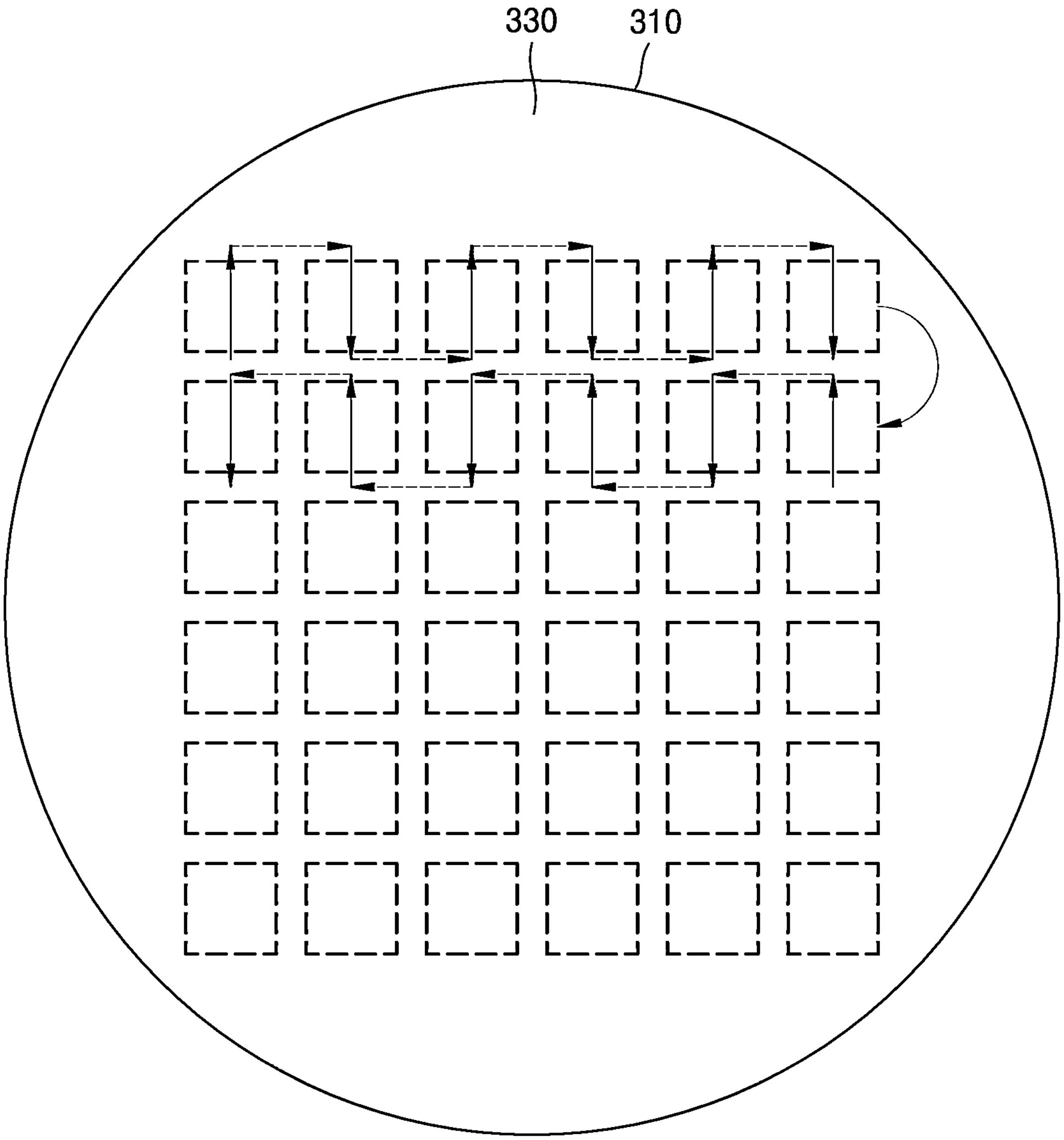

FIGS. 12A and 12B are views explaining details of the exposure process illustrated in FIG. 11C.

The exposure device 250 described in FIG. 11C may include a light source 251, an aperture stop 253, and one or more lenses 255, 256, and 257. Also, the exposure device 250 may further include a driving stage (not shown) for moving the reticle 200 and a wafer WA. The lens 255 is a collimating lens for collimating incident light, and the lenses 256 and 257 are a relay lens 259 for adjusting beam widths. The configuration of the lens optical system is just one example and may be changed into other configurations.

The light from the light source 251 is not directed to peripheral regions of the lens 255 by the aperture stop 253, but proceeds only toward the central region near an optical axis, and a certain region on the wafer WA is exposed in a certain pattern, by this light. Also, the reticle 200 and the wafer WA may be simultaneously and precisely moved, and thus, the wafer WA may be entirely exposed.

As shown in FIG. 12B, regions of the photoresist layer 330 formed on the substrate 310 may be scanned, stepped, and exposed as indicated by arrows.

This method exposes the wafer WA using only light that does not cause lens distortion, unlike a general stepper that uses the entire light transmitted through a lens. Therefore, the accuracy of an edge process may be improved, and it is advantageous for producing a large-area master stamp.

FIGS. 13A to 13E are views showing an example of a process of replicating the master stamp 300 to form a replica mold 400 and manufacturing a meta lens 500 using the replica mold 400.

Figure 13A:
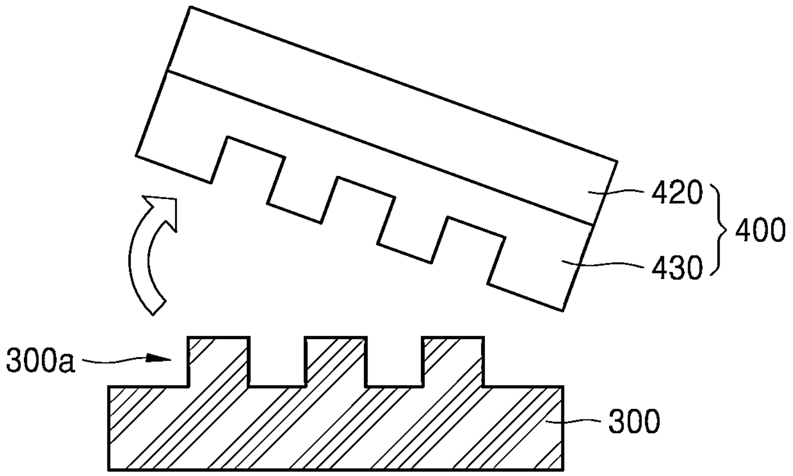
FIGS. 13A to 13E are views showing an example of a process of replicating the master stamp to form a replica mold and manufacturing a meta lens using the replica mold.

Referring to FIG. 13A, the replica mold 400 is formed by replicating the pattern 300*a* formed on the master stamp 300. The pattern 300*a* formed by embossing or engraving on the master stamp 300 has a shape corresponding to the shape and arrangement of the nanostructures that constitute the meta lens to be manufactured. A mold material may be pressed onto the master stamp 300 to form the replica mold 400 to which the pattern 300*a* of the master stamp 300 is replicated. The replica mold 400 may include a first layer 420 and a second layer 430. The second layer 430, which is in direct contact with the pattern 300*a* of the master stamp 300, may include a material that has lower viscosity and higher mechanical rigidity than the first layer 420. For example, the first layer 420 may include hard polydimethylsiloxane (PDMS), and the second layer 430 may include hard polydimethylsiloxane (h-PDMS). However, this is only an example, and the replica mold 400 may be formed as a single layer of a flexible material.

Figure 13B:
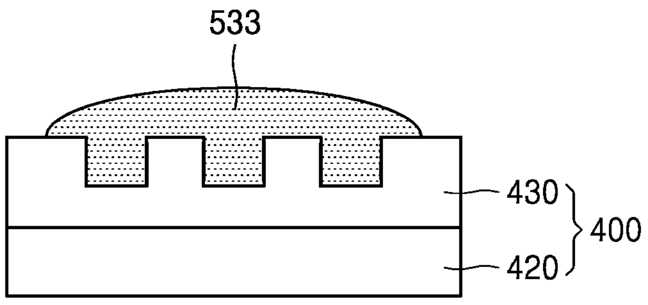

Referring to FIG. 13B, a UV curable resin 533 is applied onto the replica mold 400. The UV curable resin 533 is provided in an uncured liquid state and fills the inside of the engraved regions formed in the replica mold 400.

Figure 13C:
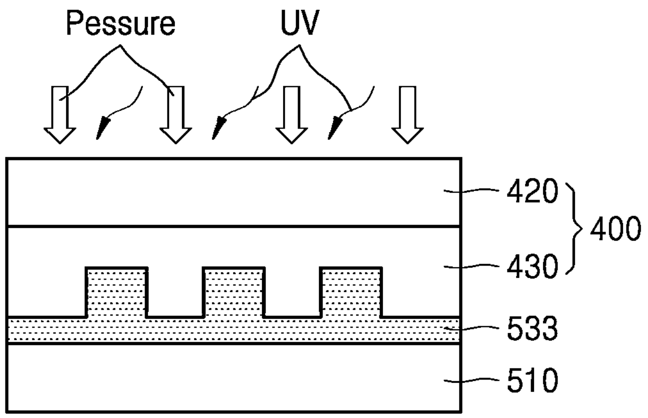
Figure 13D:
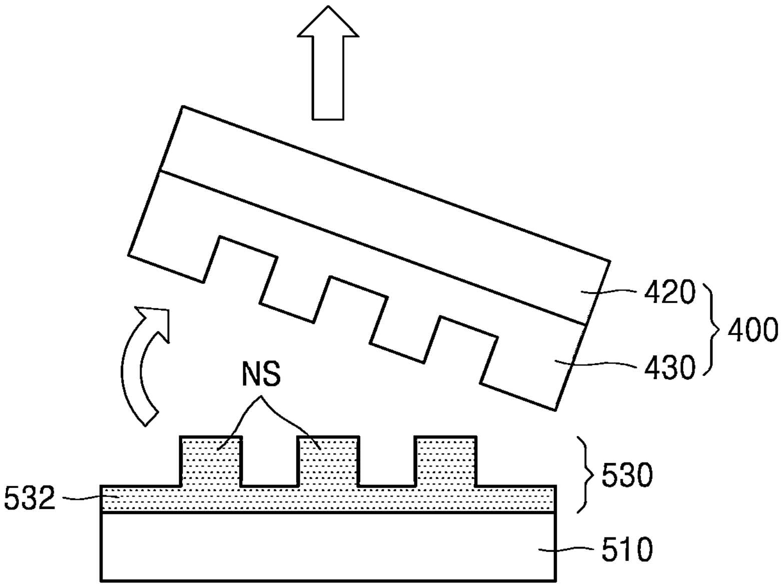

Referring to FIG. 13C, after a substrate 510 is placed above the structure shown in FIG. 13B, pressure is applied and UV light is emitted thereto. During this process, the UV curable resin 533 is cured. The cured UV curable resin 533 forms a nanostructure layer 530 including the plurality of nanostructures NS as shown in FIG. 13D. The nanostructure layer 530 may have a shape that further includes a flat layer 532. The flat layer 532 may be very thin or substantially non-existent.

Referring to FIG. 13D, the replica mold 400 is separated from the nanostructure layer 530. As described above, the UV curable resin used as the material for the nanostructure layer 530 may be selected as a material having low surface energy and low shrinkage. Therefore, this separation process may be easily performed without causing damage to the replica mold 400 or the nanostructures NS.

Figure 13E:
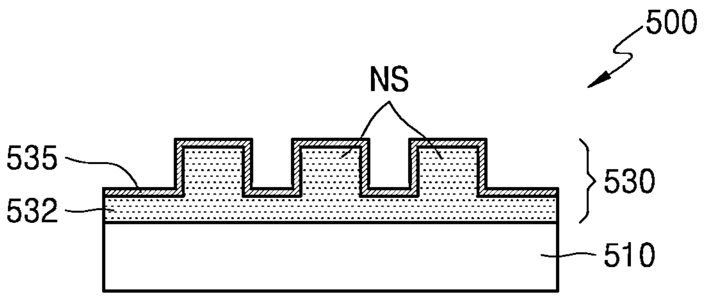

Referring to FIG. 13E, when a high refractive index atomic layer 535 is formed on the surfaces of the nanostructures NS, a wafer-level meta lens 500 is completed.

The high refractive index atomic layer 535 may be conformally deposited along the surfaces of the nanostructures NS. Various deposition methods may be used to form the high refractive index atomic layer 535, and sputtering or atomic layer deposition (ALD) may be used. The high refractive index atomic layer 535 may include a material having a higher refractive index than the nanostructures NS.

The thickness of the high refractive index atomic layer 535 may be about 20 nm to about 30 nm or about 20 nm to about 25 nm, but the embodiment is not limited thereto. The thickness of the high refractive index atomic layer 535 may be appropriately determined considering the polarization conversion efficiency for incident light.

The wafer-level meta lens 500 may include a very large number of meta lenses proportional to the diameter of the substrate 510. The substrate 510 may have a diameter of about 30 cm, for example.

The above-described manufacturing method utilizes the replica mold 400 that can be used repeatedly and has a large area, which is advantageous for mass production of the meta lenses. For example, a general photolithography process has a low yield in forming the detailed shape of the nanostructures provided in the meta lens. Also, when manufacturing a meta lens using electron beam lithography, it takes a long time to manufacture one meta lens and the manufacturing cost is high. Therefore, these methods are not suitable for mass production of meta lenses.

The manufacturing method according to the embodiment includes processes of making the reticle 200 using electron beam lithography, manufacturing the master stamp 300 having a large area through a scan and step-type exposure process using the reticle 200, and replicating the pattern of the master stamp 300 on the replica mold 400. Here, the replica mold 400 may be used repeatedly multiple times. Also, if the replica mold 400 becomes difficult to reuse, the replica mold 400 may be remanufactured using the master stamp 300.

Figure 14:
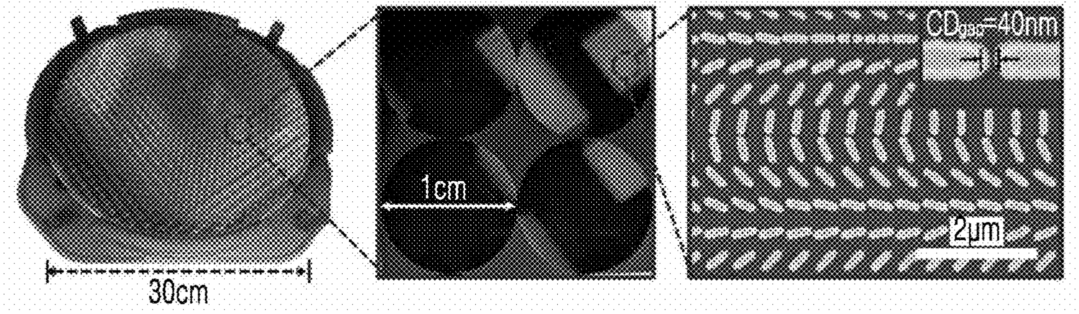
FIG. 14 shows microscope images of a wafer on which meta lenses are formed through a meta lens manufacturing method according to an embodiment.

FIG. 14 shows microscope images of a wafer on which meta lenses are manufactured through the meta lens manufacturing method according to an embodiment.

As shown in the microscope images, it is confirmed that structures having a critical dimension (CD) of about 40 nm have been appropriately manufactured.

According to this manufacturing method, it was experimentally confirmed that 68 meta lenses could be mass-produced on a 4-inch wafer, 153 meta lenses on a 6-inch wafer, 272 meta lenses on an 8-inch wafer, and 669 meta lenses on a 12-inch wafer. In addition, as a result of performing a defect test on 68 meta lenses formed on the 4-inch wafer, it was confirmed that no defects were found in 65 meta lenses, that is, a yield of about 95% was achieved.

Figure 15:
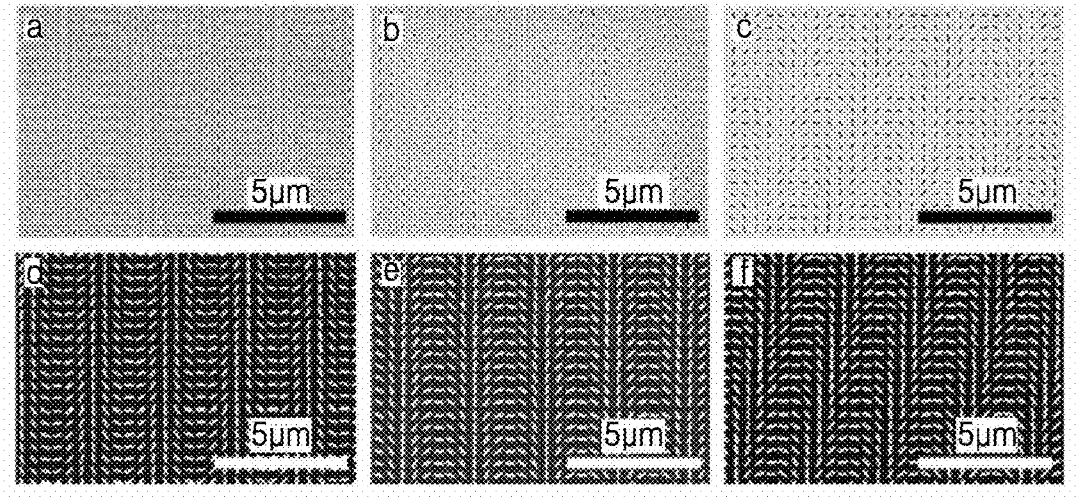
FIG. 15 shows enlarged microscope images of a part of the meta lens manufactured through the meta lens manufacturing method according to an embodiment.

FIG. 15 shows enlarged microscope images of part of the meta lens manufactured through the meta lens manufacturing method according to an embodiment.

In scanning electron microscope (SEM) images illustrated in the drawing, the images marked 'a' and 'd' show structures obtained using a replica mold that has been used five times. The images marked 'b' and 'e' and the images marked 'c' and 'f' show structures obtained using replica molds that have been used 10 and 20 times, respectively.

These experimental results show that meta lenses having high optical efficiency may be mass-produced with high yield through the manufacturing method according to an embodiment. These results have not been reported in existing meta lens structures or existing meta lens manufacturing methods.

For example, in the existing meta lens manufacturing method by an imprint process, it has been reported that optical efficiency is less than or equal to 50%, except for specific wavelengths that are the designed target wavelengths, due to limitations in materials that may be used in large-area processes.

In order to obtain a structure for improving the performance of a meta lens in the visible wavelength band, a method of manufacturing the meta lens by mixing nanoparticles having a high refractive index into resin has been attempted, but the yield of meta lenses manufactured in this method is only about 50%. This may be caused by the limitation in selecting a resin material suitable for mixing nanoparticles.

In the manufacturing method according to an embodiment, there is no process of mixing nanoparticles with resin, and thus, the freedom of resin that may be used is increased. For example, it is possible to use a resin having characteristics of low surface energy and low shrinkage that allows post-processing to be performed without additional surface treatment.

FIGS. 16A to 17C are views showing performance of the meta lens according to an embodiment.

Figure 16A:
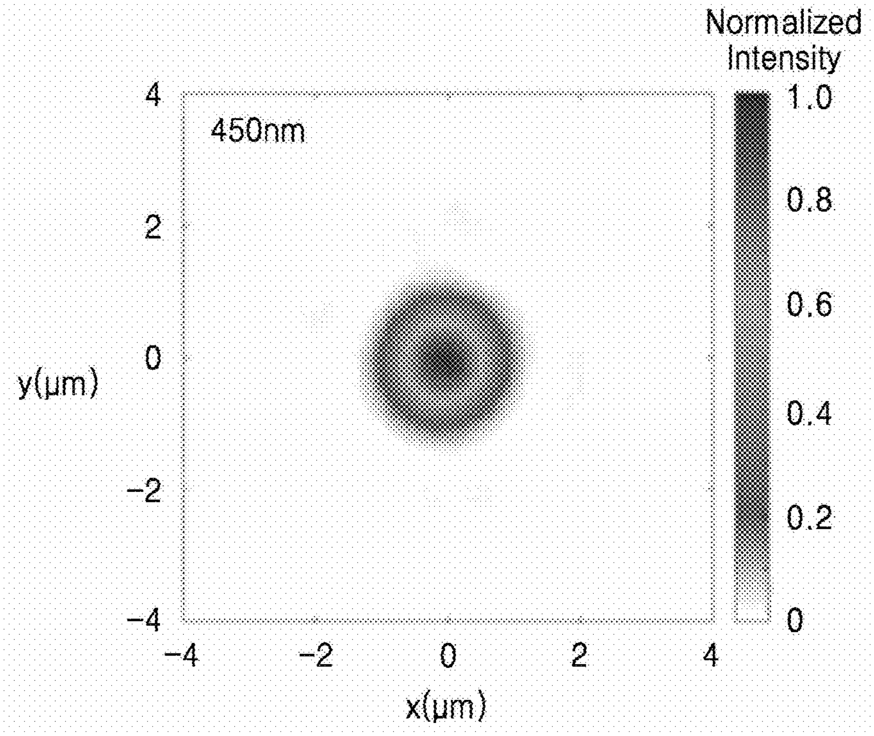
FIGS. 16A to 16C and 17A to 17C are views showing performance of the meta lens according to an embodiment.
Figure 16B:
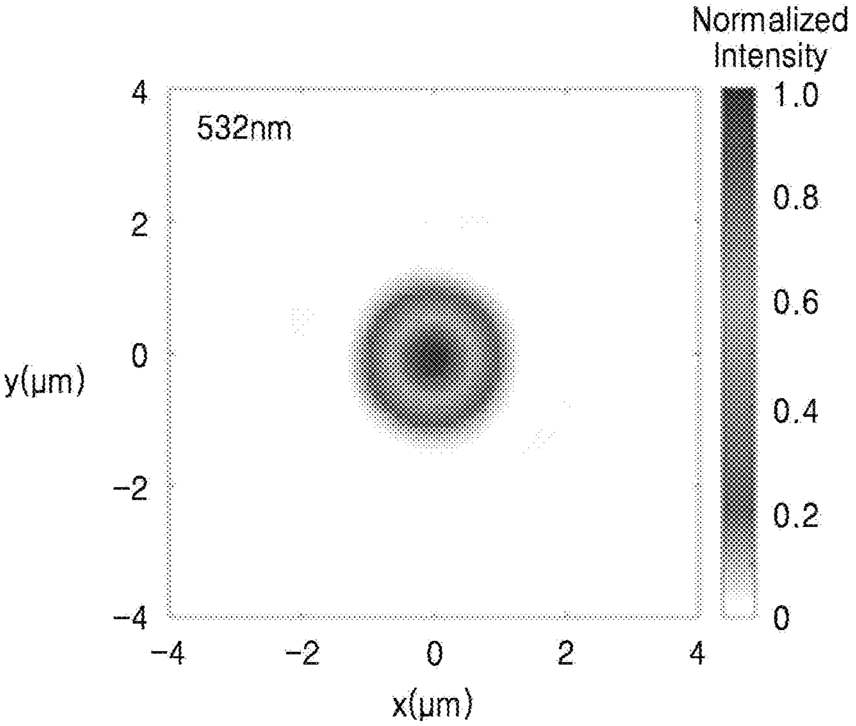
Figure 16C:
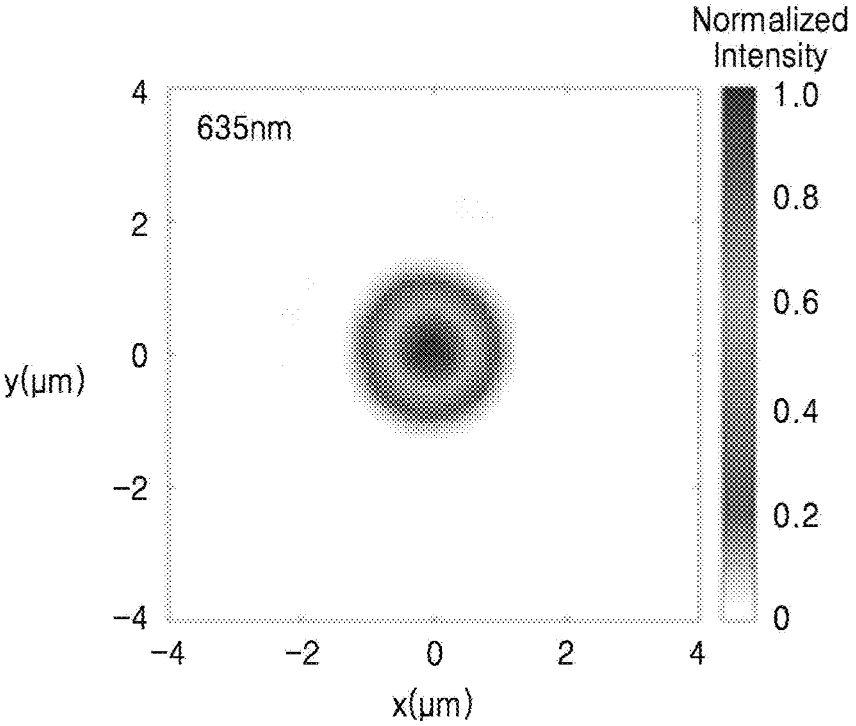

FIGS. 16A, 16B, and 16C are light intensity distribution diagrams showing focusing performances for light with wavelengths of 450 nm, 532 nm, and 635 nm, respectively.

Figure 17A:
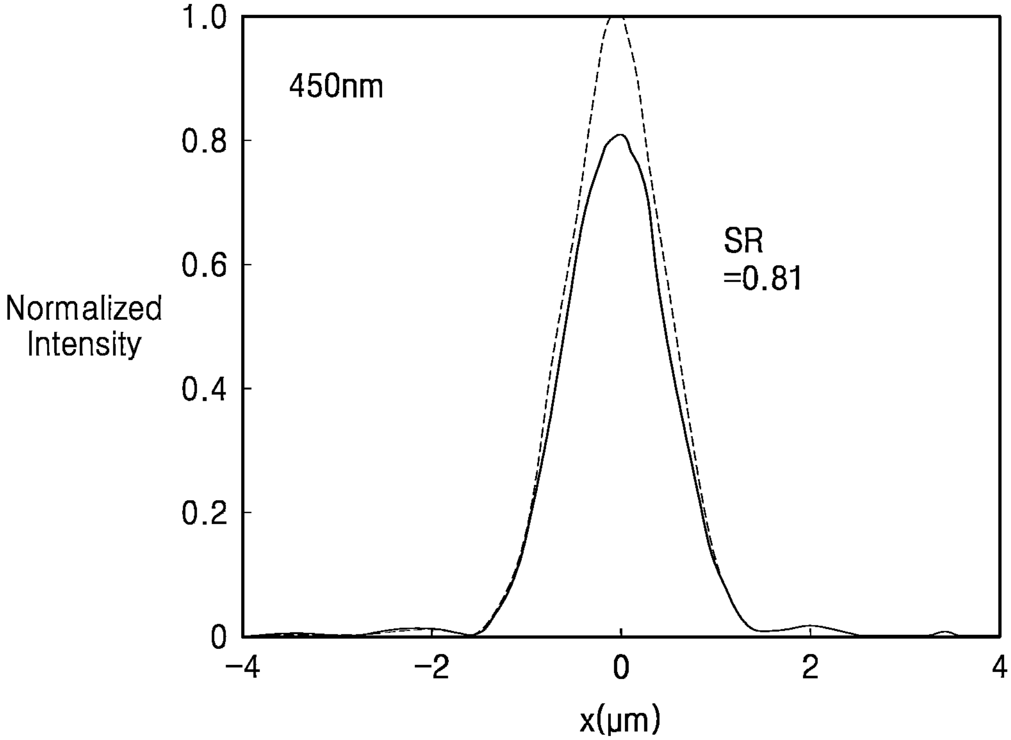
Figure 17B:
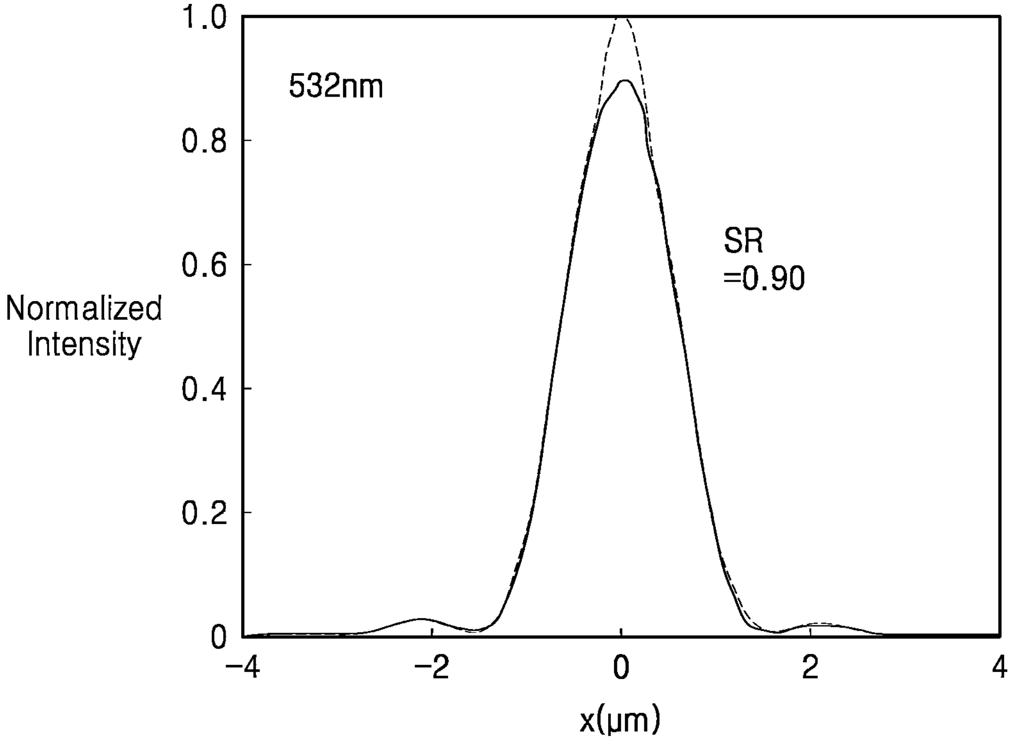
Figure 17C:
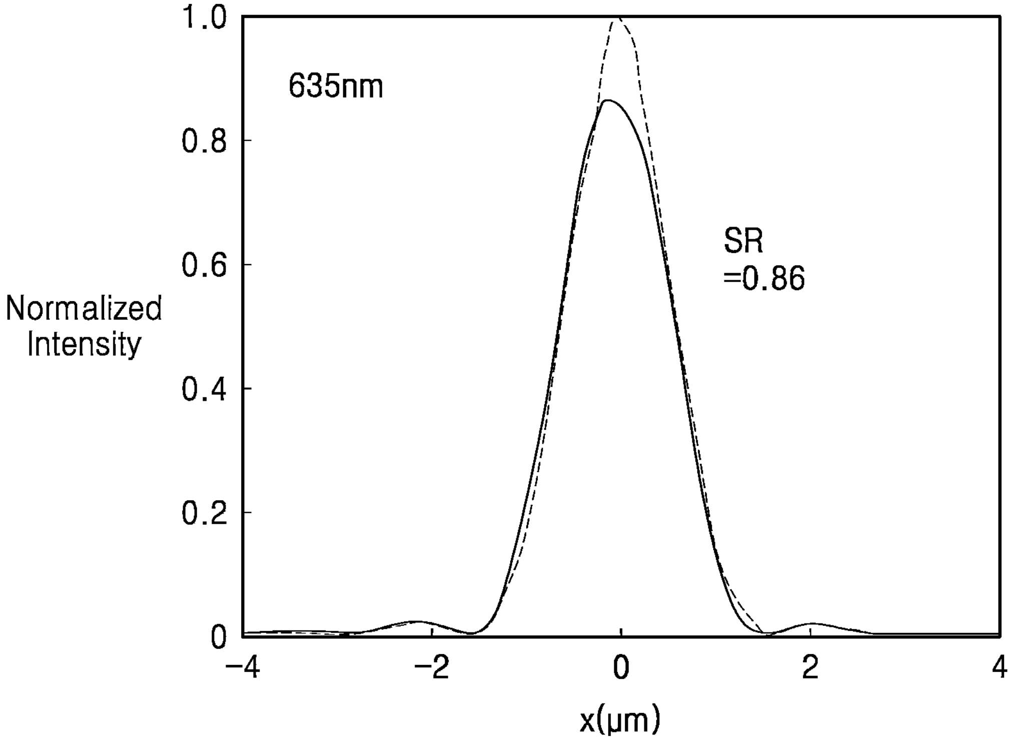

FIGS. 17A, 17B, and 17C are graphs in which the focusing performances for the light with wavelengths of 450 nm, 532 nm, and 635 nm are expressed in Strehl ratio (SR), respectively.

It can be seen that the meta lenses manufactured through the manufacturing method according to an embodiment exhibit appropriate focusing performances for light in the entire visible wavelength band.

Figure 18:
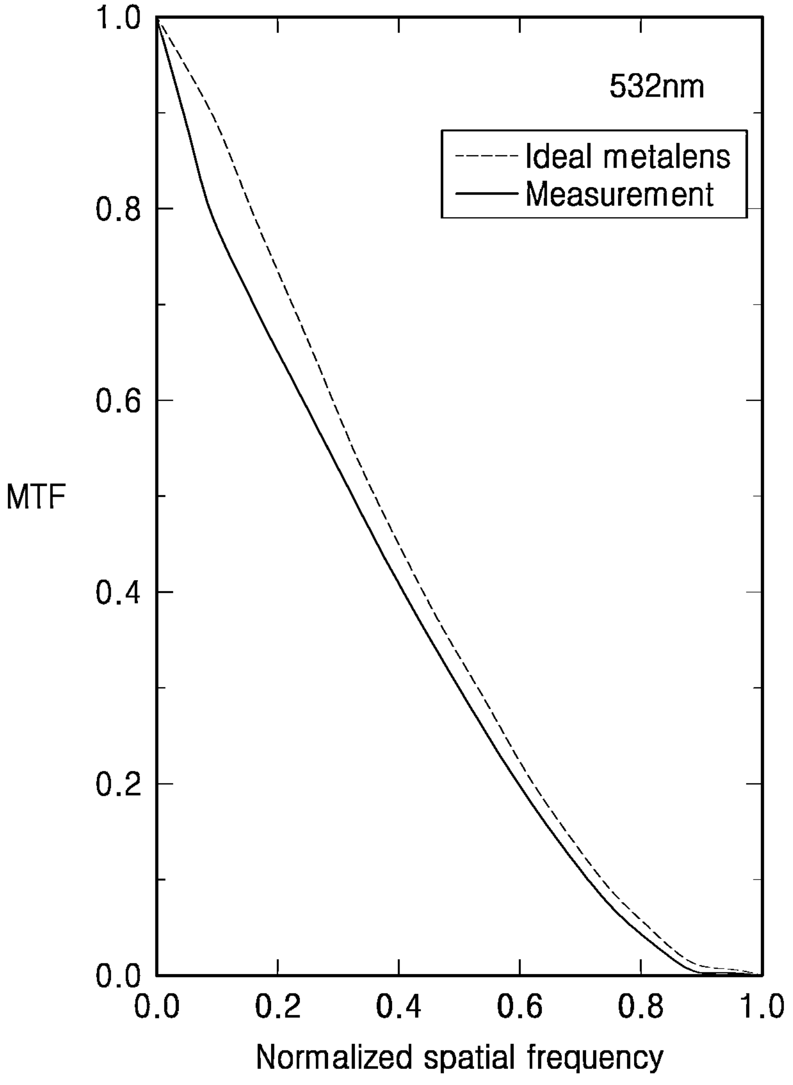
FIG. 18 is a graph showing a modulation transfer function of the meta lens according to an embodiment.

FIG. 18 is a graph showing a modulation transfer function (MTF) by the meta lens according to an embodiment.

It can be seen that the measured MTF is very close to the MTF of an ideal meta lens.

Figure 19:
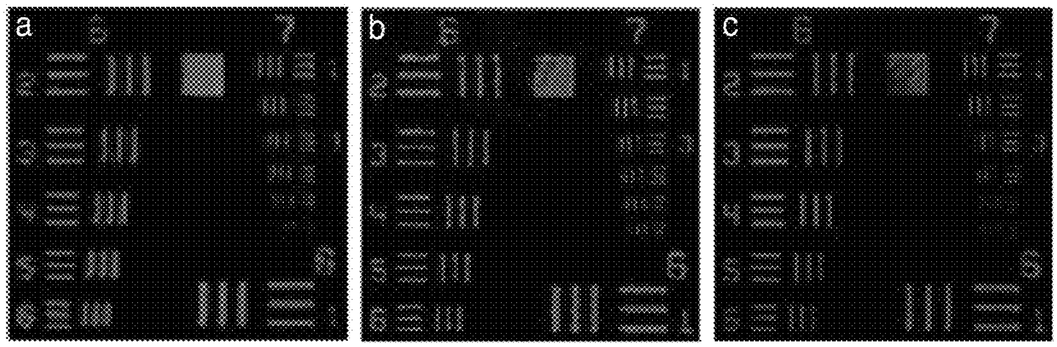
FIG. 19 illustrates views of resolution performance of the meta lens according to an embodiment.

FIG. 19 illustrates views of resolution performance of the meta lens according to an embodiment.

The resolution test of the meta lens used a 1951 USAF negative resolution target, and it was confirmed that resolution for sizes less than or equal to 3 μm was possible.

Figure 20:
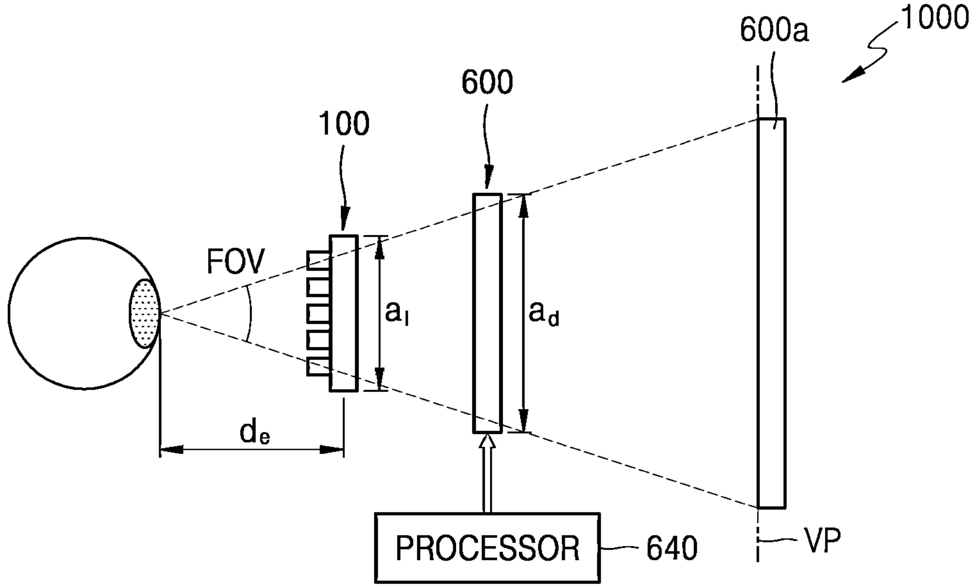
FIG. 20 shows a schematic structure of an electronic device according to an embodiment.

FIG. 20 shows a schematic structure of an electronic device 1000 according to an embodiment.

The electronic device 1000 includes a display device 600 and a meta lens 100. The electronic device 1000 may further include a processor 640 that controls the display device 600.

The display device 600 provides image light and may include a variety of known display devices. For example, the display device 600 may include a liquid crystal on silicon (LCoS) device, a liquid crystal display (LCD) device, an organic light emitting diode (OLED) display device, and a digital micromirror device (DMD). Also, the display device 600 may include next-generation display devices, such as a micro LED and a QD (quantum dot) LED.

The image light provided from the display device 600 may include a two-dimensional image or a three-dimensional image. The three-dimensional image may include, for example, a stereo image, a hologram image, a light field image, or an integral photography image, and may also include a multi-view or super multi-view images.

The meta lens 100 may form an image of the image light, which is provided from the display device 600, on the field of view of a user. The user may perceive the image, which is provided from the display device 600, as an enlarged image 600*a* that floats on a virtual image plane (VP) at a certain location. The position of the virtual image plane VP and the magnification at which the image is enlarged are determined by a focal length of the meta lens 100, a distance de between the eyes of the user and the meta lens 100, and a distance between the meta lens 100 and the display device 600. A field of view FOV may be determined by the distance de between the eyes of the user and the meta lens 100 and an effective diameter al of the meta lens 100.

The electronic device 1000 may be used as a virtual reality device and provided in an eye-wearable form.

Figure 21:
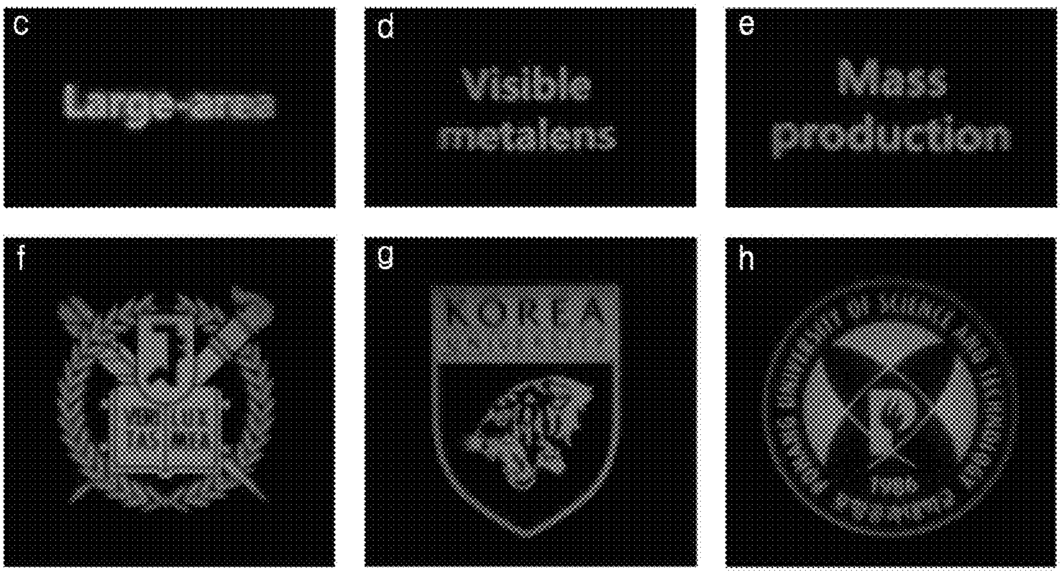
FIG. 21 illustrates photographs experimentally showing that the meta lens according to an embodiment may be applied to a virtual reality device.

FIG. 21 illustrates photographs experimentally showing that the meta lens according to an embodiment may be applied to a virtual reality device.

The photographs illustrated in FIG. 21 are obtained by forming images of a screen, which are floated through a micro display, using a meta lens and then capturing the images with a mobile phone.

Figure 22:
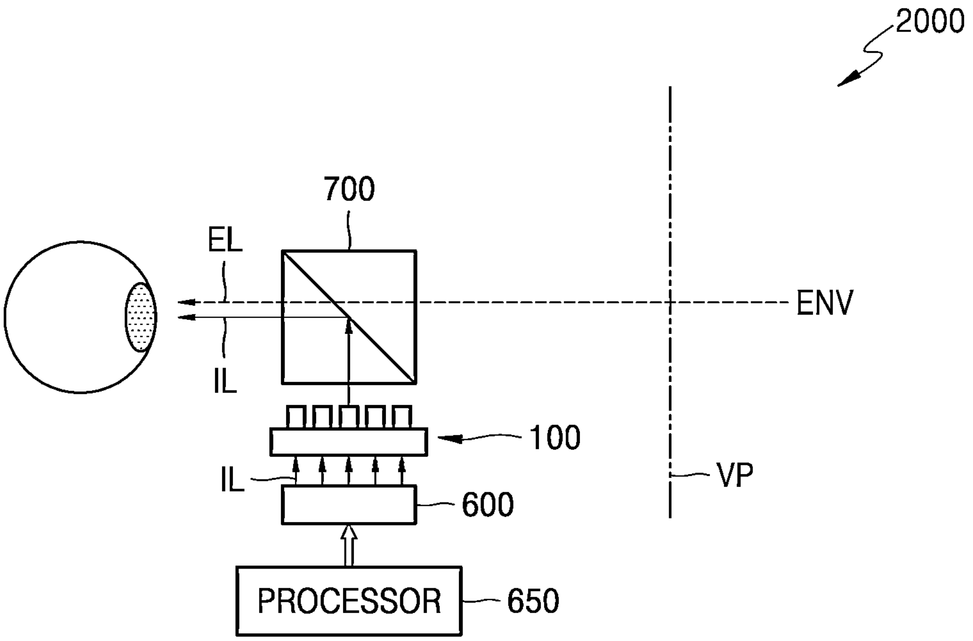
FIG. 22 shows a schematic structure of an electronic device according to another embodiment.

FIG. 22 shows a schematic structure of an electronic device 2000 according to another embodiment.

The electronic device 2000 includes a display device 600 that provides image light IL and a meta lens 100 that forms an image of the image light IL on a field of view of a user. The electronic device 2000 may further include a beam splitter 700 located on a path through which the image light IL is directed to the field of view of the user and a processor 650 controlling the display device 600.

The beam splitter 700 may change the direction of the path of the image light IL toward the field of view of the user. The beam splitter 700 may also transmit ambient light EL, which comes from a surrounding environment ENV of the user, toward the field of view of the user. The beam splitter 700 may include a half mirror or a polarization beam splitter. Depending on the type of the beam splitter 700, additional optical elements may be provided on the path of the image light IL or the path of the ambient light EL.

For example, the processor 650 may control the display device 600 to output an additional image based on the environment the user is looking at.

The user perceives the image light IL, which is provided from the display device 600, as an enlarged image that floats on a virtual image plane VP located at a certain distance in front of the user and may also perceives the ambient light EL.

This electronic device 2000 may be used as an augmented reality device.

Figure 23:
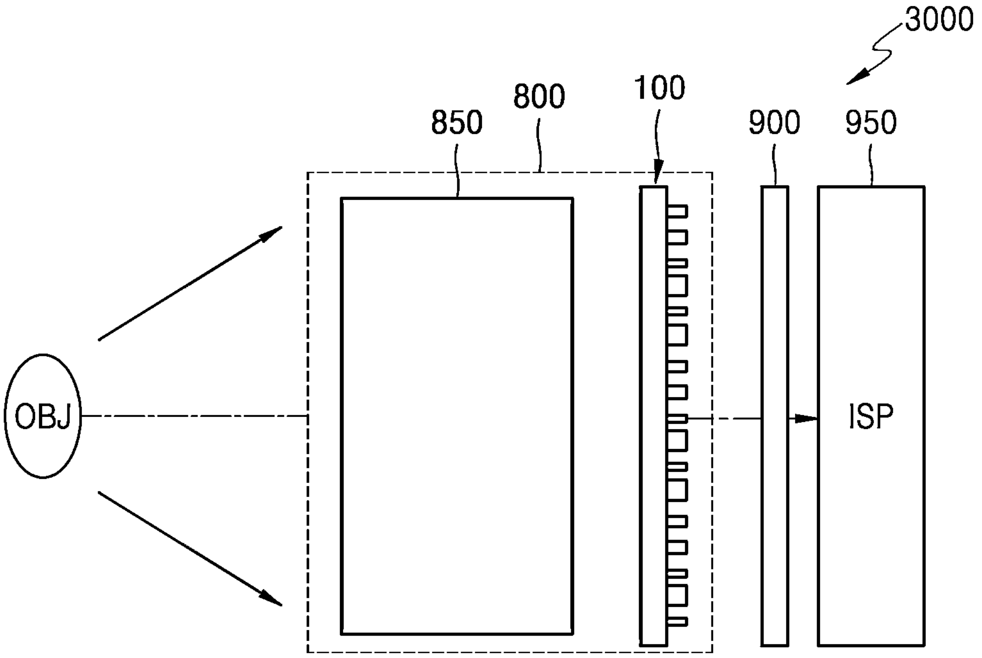
FIG. 23 shows a schematic structure of an electronic device according to another embodiment.

FIG. 23 shows a schematic structure of an electronic device 3000 according to another embodiment.

The electronic device 3000 includes a lens assembly 800 including a meta lens 100, an image sensor 900 that converts an optical image of an object OBJ formed by the lens assembly 800 into an electrical signal, and an image signal processor 950 that processes a signal from the image sensor 900.

The lens assembly 800 may further include an additional lens unit 850 in addition to the meta lens 100. The lens unit 850 may include one or more lenses, and the one or more lenses may include a general refractive lens or a meta lens.

The position of the meta lens 100 is not limited to the position illustrated in the drawing and may be changed to any suitable position inside the lens assembly 800 or any suitable position inside the lens unit 850.

The meta lens described above may operate with high efficiency for light in the visible wavelength band.

According to the meta lens manufacturing method described above, the meta lenses may be mass-produced, and the process yield may also be improved.

According to the meta lens manufacturing method described above, there is a high degree of freedom in selecting a variety of UV curable resins for the imprint process.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An electronic device comprising:
- a display device configured to provide image light;
- a meta lens being configured to focus the image light onto a field of view of a user, the meta lens comprising:
  - a substrate;
  - a plurality of nanostructures provided on the substrate; and
  - a high refractive index atomic layer formed along surfaces of the plurality of nanostructures and comprising a material having a refractive index greater than a refractive index of the plurality of nanostructures;
- a beam splitter in a path along which the image light is directed to the field of view; and
- a processor configured to control the display device to output an additional image based on an environment of the user.

2. The electronic device of claim 1, wherein the high refractive index atomic layer comprises $TiO_2$.

3. The electronic device of claim 1, wherein a thickness of the high refractive index atomic layer is about 20 nm to about 30 nm.

4. The electronic device of claim 1, wherein a thickness of the high refractive index atomic layer is determined such that a polarization conversion efficiency of green light by the plurality of nanostructures coated with the high refractive index atomic layer is 70% or more.

5. The electronic device of claim 1, wherein the high refractive index atomic layer comprises $ZrO_2$.

6. The electronic device of claim 1, wherein the plurality of nanostructures comprise ultraviolet (UV) curable resin.

7. The electronic device of claim 1, further comprising a flat layer between the substrate and the plurality of nanostructures and comprising a same material as the plurality of nanostructures.

8. A method of manufacturing a meta lens, the method comprising:
- manufacturing a master stamp that comprises a substrate and a first pattern in the substrate, the first pattern corresponding to an array of a plurality of nanostructures to be provided in the meta lens;
- manufacturing a replica mold by replicating the master stamp;
- forming a nanostructure layer including the plurality of nanostructures by imprinting the replica mold on an ultraviolet (UV) curable resin; and
- forming a high refractive index atomic layer on surfaces of the plurality of nanostructures,
- wherein the manufacturing the master stamp comprises forming the first pattern in the substrate,
- wherein forming the first pattern in the substrate comprises:
  - forming a photoresist layer on the substrate; and
  - patterning the photoresist layer to have the first pattern by performing a scan and step exposure process using only some light that is incident near an optical axis of a lens optical system.

9. The method of claim 8, further comprising preparing a reticle for manufacturing the master stamp.

10. The method of claim 8, wherein the forming the first pattern in the substrate further comprises:

forming a hard mask layer on the substrate, wherein forming the photoresist layer further comprises forming the photoresist layer on the hard mask layer;

patterning the hard mask layer according to the patterned photoresist layer to have the first pattern; and patterning the substrate according to the patterned photoresist layer and the patterned hard mask layer to have the first pattern.

11. The method of claim 10, wherein the substrate comprises a silicon substrate having a diameter of 4 inches or more.

12. The method of claim 10, wherein the hard mask layer comprises an amorphous carbon layer.

13. The method of claim 8, wherein the high refractive index atomic layer comprises $TiO_2$.

14. The method of claim 8, wherein a thickness of the high refractive index atomic layer is about 20 nm to about 30 nm.

* * * * *